(12) United States Patent
Kobayashi et al.

(10) Patent No.: US 10,048,922 B2
(45) Date of Patent: Aug. 14, 2018

(54) SYSTEM, APPARATUS, AND METHOD FOR DISPLAYING INFORMATION ON A HEAD MOUNTED DISPLAY

(71) Applicant: SEIKO EPSON CORPORATION, Tokyo (JP)

(72) Inventors: Shinichi Kobayashi, Azumino (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 31 days.

(21) Appl. No.: 15/097,879

(22) Filed: Apr. 13, 2016

(65) Prior Publication Data

US 2017/0010850 A1    Jan. 12, 2017

(30) Foreign Application Priority Data

Jul. 6, 2015  (JP) ................. 2015-135194

(51) Int. Cl.
*G06F 3/14* (2006.01)
*G06F 3/01* (2006.01)
*G02B 27/01* (2006.01)
*G02B 27/00* (2006.01)
*G06F 3/00* (2006.01)
*G06Q 10/06* (2012.01)
*G09B 5/06* (2006.01)

(52) U.S. Cl.
CPC ....... *G06F 3/1454* (2013.01); *G02B 27/0093* (2013.01); *G02B 27/0172* (2013.01); *G06F 3/005* (2013.01); *G06F 3/012* (2013.01); *G02B 2027/014* (2013.01); *G02B 2027/0138* (2013.01); *G02B 2027/0141* (2013.01); *G06F 3/1423* (2013.01); *G06Q 10/06* (2013.01); *G09B 5/06* (2013.01)

(58) Field of Classification Search
CPC ...... G06F 3/1454; G06F 3/005; G06F 3/1423; G02B 2027/0138; G02B 2027/014; G02B 2027/0141; G02B 27/0093; G06Q 10/06
See application file for complete search history.

(56) References Cited

U.S. PATENT DOCUMENTS

| 8,994,613 B1* | 3/2015 | Johnson | G09G 5/37 345/178 |
| 2014/0126018 A1* | 5/2014 | Sugimoto | G06F 3/013 358/1.15 |

(Continued)

FOREIGN PATENT DOCUMENTS

| JP | 2007-320715 A | 12/2007 |
| JP | 2008-113317 A | 5/2008 |

*Primary Examiner* — Xuemei Zheng
(74) *Attorney, Agent, or Firm* — Oliff PLC

(57) ABSTRACT

An HMD includes an image display section that allows a user to view an image and transmits an outside scene, an evaluation section that evaluates the state of the user, and a communication section that communicates with another HMD. A control section transmits visual field data on the basis of images captured with a right camera and a left camera to the other HMD, causes the communication section to transmit notification data on the basis of a result of the evaluation performed by the evaluation section to the other HMD, and causes the image display section to perform display on the basis of data transmitted from the other HMD.

10 Claims, 12 Drawing Sheets

(56) References Cited

U.S. PATENT DOCUMENTS

2016/0027218 A1\* 1/2016 Salter ................. G02B 27/0172
  345/633
2016/0202947 A1\* 7/2016 Ramalingam ........ G02B 27/017
  345/156

\* cited by examiner

| TRANSMISSION DESTINATION SETTING DATA | |
|---|---|
| TRANSMISSION DESTINATION ID | DATA TO BE TRANSMITTED |
| ID : 0001 | VISUAL FIELD DATA / NOTIFICATION DATA |
| ID : 0003 | NOTIFICATION DATA |
| — | — |

FIG. 8A

| WORK STANDARD SHEET | | |
|---|---|---|
| WORK 1 . | WORK CONTENT 1 | COMPLETE |
| WORK 2 . | WORK CONTENT 2 | COMPLETE |
| WORK 3 . | WORK CONTENT 3 | UNDER EXECUTION |
| WORK 4 . | WORK CONTENT 4 | NOT EXECUTED |
| ↑ 133b | ↑ 133a | ↑ 133c |

FIG. 8B

SYSTEM, APPARATUS, AND METHOD FOR DISPLAYING INFORMATION ON A HEAD MOUNTED DISPLAY

BACKGROUND

1. Technical Field

The present invention relates to a display system, a display apparatus, and a method for controlling the display apparatus, and a program.

2. Related Art

To assist a person who performs work, there has been a known case where a display apparatus called a head mounted display (HMD) worn around the person's head is used (see JP-A-2008-113317, for example). In the system described in JP-A-2008-113317, the HMD that the worker wears includes an electronic camera, and an image of a work target captured with the electronic camera of the HMD is displayed on a host PC operated by a person who gives an instruction. The person who gives an instruction looks at the image of the work target captured with the electronic camera and causes the HMD on the worker to display an alarm or any other type of information.

In the configuration of related art described above, in which the person who gives an instruction to assist the worker grasps the state of the worker from the image displayed on the PC, it has been desired that the person who assists the worker convey a large amount of information in a more understandable form.

SUMMARY

An advantage of some aspects of the invention is to enable a person, when the person assists another person using a head mounted display to perform an action, to give a large amount of information on the action in a more understandable manner.

An aspect of the invention relates to a system including a plurality of head-mounted-type display apparatus, and each of the display apparatus includes a display section that allows a user to view an image and transmits an outside scene, a communication section that communicates with another display apparatus of the plurality of display apparatus, an imaging section that performs image capturing over a range that overlaps with a visual field of the user, an evaluation section that evaluates a state of the user, and a control section, and the control section transmits visual field data on the basis of an image captured by the imaging section to the another display apparatus, causes the communication section to transmit notification data on the basis of a result of the evaluation performed by the evaluation section to the another display apparatus, and causes the display section to perform display on the basis of data transmitted from the another display apparatus.

According to the aspect of the invention, in which data on the visual fields and data on inputs can be shared among the plurality of display apparatus, a plurality of users who wear the display apparatus can share the visual fields and operation. Therefore, for example, a person who performs an action and a person who assists the action wear the head-mounted-type display apparatus for conveyance of a large amount of information on actions in a more understandable manner. Further, evaluation of the state of a user allows notification data to be transmitted at appropriate timing. A user can therefore assist another user who performs work or any other type of act or readily and accurately administer the state in which work or any other type of act is performed.

In the display system according to the aspect of the invention, the evaluation section may evaluate, on the basis of an action of the user, whether the state of the user corresponds to a state in which notification set in advance should be made, and when the evaluation section determines that the state of the user corresponds to the state in which notification should be made, the control section may cause the communication section to transmit notification data to the another display apparatus.

According to the aspect of the invention with this configuration, determination that the state of the user is the state in which notification should be made can be made, and notification data can be transmitted to another apparatus.

The display system according to the aspect of the invention may further include a recognition section that recognizes an input, and the evaluation section may evaluate the state of the user on the basis of the input recognized by the recognition section.

According to the aspect of the invention with this configuration, the each of the display apparatus can recognize an input from the user or another person to appropriately evaluate the state of the user. Further, the user or another person allows the display apparatus to recognize an input to intentionally cause the display apparatus to transmit notification data to another apparatus.

The display system according to the aspect of the invention may further include a voice processing section that detects voice, and the recognition section may recognize an input on the basis of the voice detected by the voice processing section.

According to the aspect of the invention with this configuration, each of the display apparatus can accept an input in the form of voice, whereby information can be more readily conveyed among the plurality of display apparatus.

In the display system according to the aspect of the invention, the control section may transmit data representing the input recognized by the recognition section on the basis of the voice detected by the voice processing section to the another display apparatus.

According to the aspect of the invention with this configuration, a content inputted in the form of voice to each of the display apparatus can be notified to a user who wears another display apparatus.

The display system according to the aspect of the invention may further include a motion detection section that detects motion of the display section, and the recognition section may recognize an input on the basis of the motion detected by the motion detection section.

According to the aspect of the invention with this configuration, the recognition section can accept an input according to motion of the display section or motion of the user who wears the display section.

In the display system according to the aspect of the invention, the recognition section may recognize an input on the basis of an image captured by the imaging section.

According to the aspect of the invention with this configuration, the recognition section can recognize an input on the basis of a captured image and can therefore more readily accept an input.

In the display system according to the aspect of the invention, the control section may perform a reproduction process of reproducing action guidance data containing guidance information that gives guidance on actions, order information that specifies an order in accordance with which the actions are performed, and state information that shows a state of the performed actions, cause the display section to perform display in the reproduction process and updates, on the basis of an input recognized by the recognition section, the state information in the action guidance data being reproduced, and cause the communication section to transmit the action guidance data having undergone the reproduction process to the another display apparatus.

According to the aspect of the invention with this configuration, action guidance can be given to a user who wears the display apparatus and performs an action, and data containing records on the action performed in accordance with the guidance can be taken over and used by another display apparatus.

In the display system according to the aspect of the invention, the imaging section may perform image capturing over a range that overlaps with a direction in which the user gazes.

According to the aspect of the invention with this configuration, an image in the direction in which the user gazes can be shown to another user.

Another aspect of the invention relates to a head-mounted-type display apparatus including a display section that allows a user to view an image and transmits an outside scene, a communication section that communicates with another head-mounted-type display apparatus, an imaging section that performs image capturing over a range that overlaps with a visual field of the user, an evaluation section that evaluates a state of the user, and a control section, and the control section transmits visual field data on the basis of an image captured by the imaging section to the another display apparatus, causes the communication section to transmit notification data on the basis of a result of the evaluation performed by the evaluation section to the another display apparatus, and causes the display section to perform display on the basis of data transmitted from the another display apparatus.

According to the aspect of the invention, data on the visual fields and data on inputs can be shared with another display apparatus. Therefore, for example, in a configuration in which a plurality of users wear the display apparatus, the visual fields and operation can be shared by the users. In this case, a person who performs an action and a person who assists the action wear the display apparatus for conveyance of a large amount of information on actions in a more understandable manner. Further, evaluation of the state of a user allows notification data to be transmitted at appropriate timing.

In the aspect of the invention, a head-mounted-type display apparatus including a display section that allows a user to view an image and transmits an outside scene is caused to perform image capturing over a range that overlaps with a visual field of the user, evaluate a state of the user, transmit visual field data on the basis of captured image data to another head-mounted-type display apparatus, transmit notification data on the basis of a result of the evaluation of the state of the user to the another display apparatus, and cause the display section to perform display on the basis of data transmitted from the another display apparatus.

According to the aspect of the invention with this configuration, data on the visual fields and data on inputs can be shared with another display apparatus. Therefore, for example, in a configuration in which a plurality of users wear the display apparatus, the visual fields and operation can be shared by the users. In this case, a person who performs an action and a person who assists the action wear the display apparatus for conveyance of a large amount of information on actions in a more understandable manner. Further, evaluation of the state of a user allows notification data to be transmitted at appropriate timing.

The invention can also be configured as a program executable by a computer that controls a head-mounted-type display apparatus including a display section that allows a user to view an image and transmits an outside scene. The program causes the computer to perform image capturing over a range that overlaps with a visual field of the user, evaluate a state of the user, transmit visual field data on the basis of captured image data to another head-mounted-type display apparatus, transmit notification data on the basis of a result of the evaluation of the state of the user to the another display apparatus, and cause the display section to perform display on the basis of data transmitted from the another display apparatus. The invention may also be configured as a storage medium that stores the program.

BRIEF DESCRIPTION OF THE DRAWINGS

The invention will be described with reference to the accompanying drawings, wherein like numbers reference like elements.

FIGS. 8A and 8B are diagrammatic views showing an example of the configuration of data stored in the storage section. FIG. 8A shows an example of transmission destination setting data, and FIG. 8B shows an example of the configuration of motion guidance data.

DESCRIPTION OF EXEMPLARY EMBODIMENTS

Figure 1:
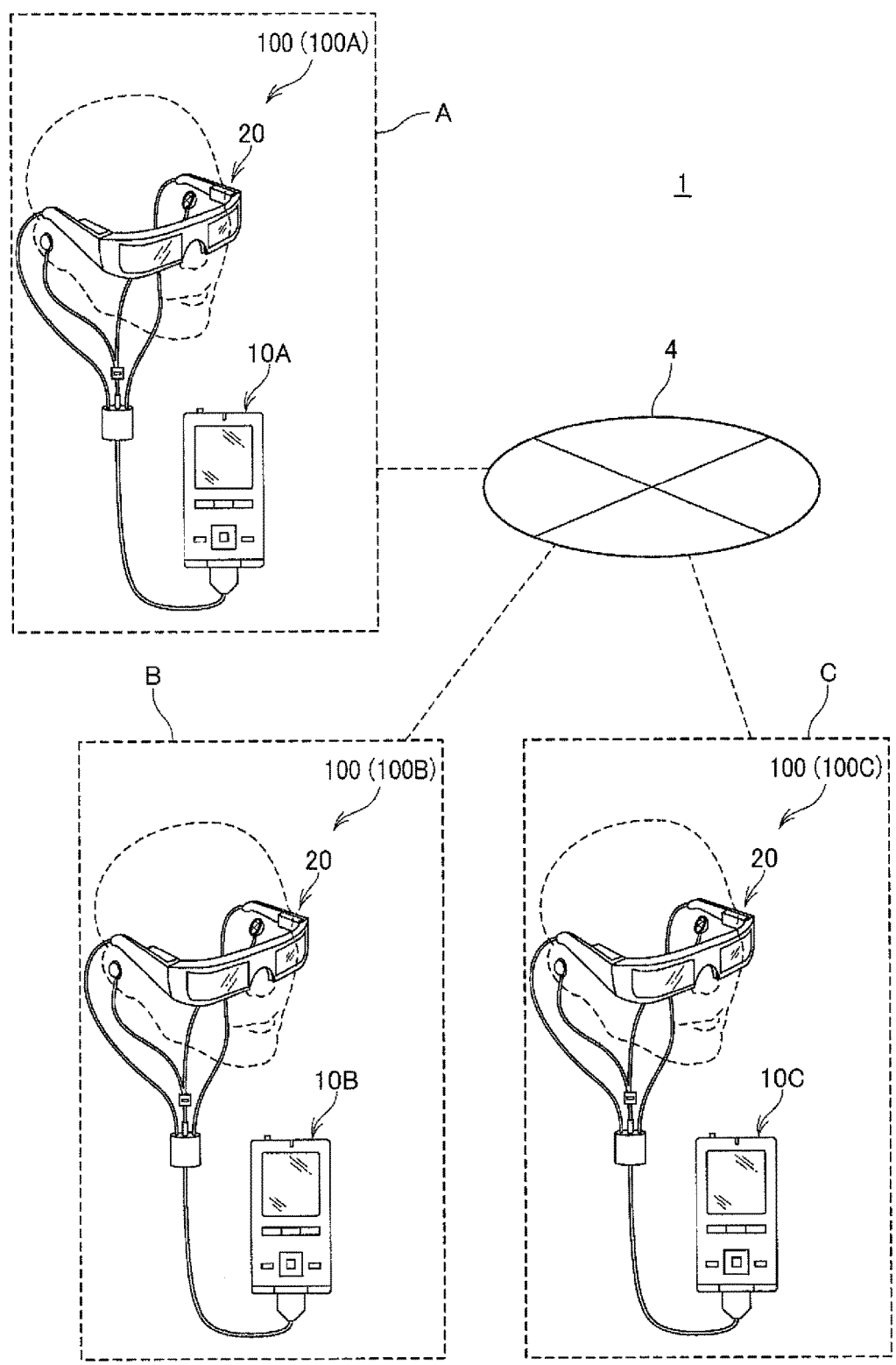
FIG. 1 is a schematic configuration diagram of a display system according to an embodiment.

FIG. 1 is a schematic configuration diagram of a display system 1 according to an embodiment to which the invention is applied.

The display system 1 includes a plurality of HMDs 100, and the HMDs 100 are connected to one another in a communicatable manner via a communication network 4. Each of the HMDs 100 is a display apparatus that a user wears around the head and also called a head mounted display. Each of the HMDs 100 is an optically transmissive HMD that allows the user to not only view a virtual image but also directly view an outside scene at the same time. In the following description, a virtual image that the HMD 100 allows the user to view is also called a "display image" for convenience. Further, outputting image light generated on the basis of image data is also referred to as "displaying an image."

Three HMDs 100 illustrated in FIG. 1 are worn by different users. For example, three users wear the HMDs 100 and are allowed to use them at the same time. In the following description, the three HMDs 100 are called HMDs 100A, 100B, and 100C for convenience of the description. The locations where the HMDs 100A, 100B, and 100C are used are assumed to be sites A, B, and C, respectively.

In the display system 1, users who perform actions wear the HMDs 100B and 100C, a user who instructs and administers actions wears the HMD 100A, and transmission and reception of information for the instruction and administration are performed among the HMDs 100A, 100B, and 100C. The sites A, B, and C are free from geographical restrictions as long as they are connectable to the communication network 4 and may be remote from each other or close to each other. In the following description, a case where the three HMDs 100A, 100B, and 100C are connected to the communication network 4 is shown, but no constraint is imposed on the number of HMDs 100 provided in the display system 1.

Figure 2:
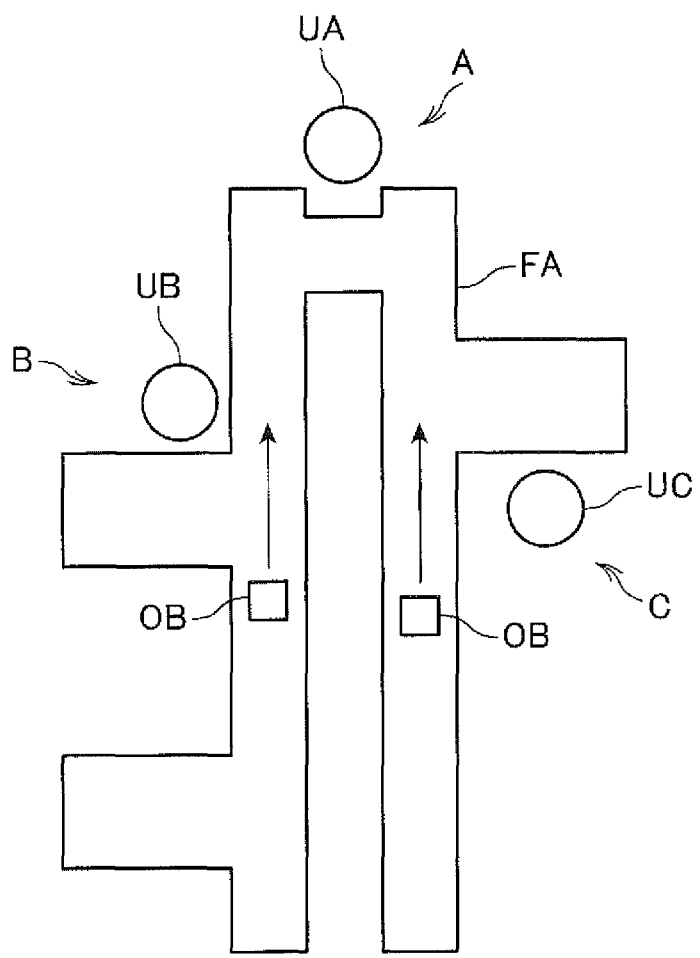
FIG. 2 shows an example of the arrangement of the display system.

FIG. 2 shows an example of the arrangement of the HMDs 100A, 100B, and 100C in the display system 1.

The HMDs 100B and 100C are arranged, for example, in the sites B and C, respectively, where workers perform work, in a work line FA in a factory. A worker UB who performs work in the site B wears the HMD 100B, and a worker UC who performs work in the site C wears the HMD 100C.

In the work line FA, targets OB, such as parts that are targets of work, are transported in the direction indicated by the arrows, and the workers UB and UC perform instructed work on the targets OB.

An administrator UA, who administers the work line FA, wears and uses the HMD 100A in the site A, which is a site for an administrator. The administrator UA uses the display system 1 to assist the work performed by the workers UB and UC, administer the progress of the work, and perform other types of action.

FIG. 2 shows an application example in which in a manufacturing factory or any other place, an administrator wears an HMD 100, workers wear HMDs 100, and the administrator assists work performed by workers, administers the progress of the work, administers the quality of a result of the work, and performs other types of action, but a target situation in which the display system 1 can be used is not limited to the manufacturing factory described above and the following application examples 1 to 4 can be listed.

Example 1

In a work place accompanied by a warehouse, workers who move in the warehouse and pick up articles and an administrator wear HMDs 100. The HMD 100 on each of the workers displays a guide path along which the worker moves in the warehouse to guide the worker and indicates an article to be picked up. The work administrator wears an HMD 100 to administer the progress of the work and perform other types of action.

Example 2

In a construction site, an HMD 100 on a worker displays the position of a facility or any other object that the worker cannot directly view, such as an underground pipe, on the basis of design drawings to guide the worker. A construction administrator wears an HMD 100 to administer the progress of the construction.

Example 3

A user who wears an HMD 100 and moves receives movement path guidance and route guidance. An administrator for the movement wears an HMD 100 and administers the situation of the movement of the user and the position thereof.

Example 4

In a medical institute, a medical practitioner who wears an HMD 100 receives assistance in medical consultation, medical examination, or any other act. An assistant who wears an HMD 100 checks act performed by the medical practitioner, administers the progress of the act, and performs other types of action.

The communication network 4 is achieved by a variety of communication lines, such as a public network, a dedicated line, a wireless communication line including a mobile telephone line, a backbone communication line of any of the lines described above, or a combination thereof, and the configuration of the communication network 4 is not limited to a specific configuration. The communication network 4 may be a wide area communication network capable of connecting remote locations to each other or a LAN (local area network) installed in a specific institution or building. The communication network 4 may include a server device and a gateway device, a router device, or any other network apparatus that connect the variety of communication lines described above to each other. The communication network 4 may instead be formed of a plurality of communication lines. The HMDs 100A, 100B, and 100C wirelessly communicate with a wireless access point (not shown) or any other device that forms the communication network 4 to transmit and receive data to and from each other via the communication network 4.

The HMDs 100A, 100B, and 100C will be described on the assumption that they have the same configuration. When the HMDs 100A, 100B, and 100C are not distinguished from each other, they are collectively called the HMD 100.

The HMD 100 includes an image display section 20, which a commander who is a user wears around the head, and a control device 10, which controls the image display section 20. The image display section 20 is worn around the user's head and allows the user to view a virtual image. The control device 10 also functions as a controller used by the user to operate the HMD 100.

Figure 3:
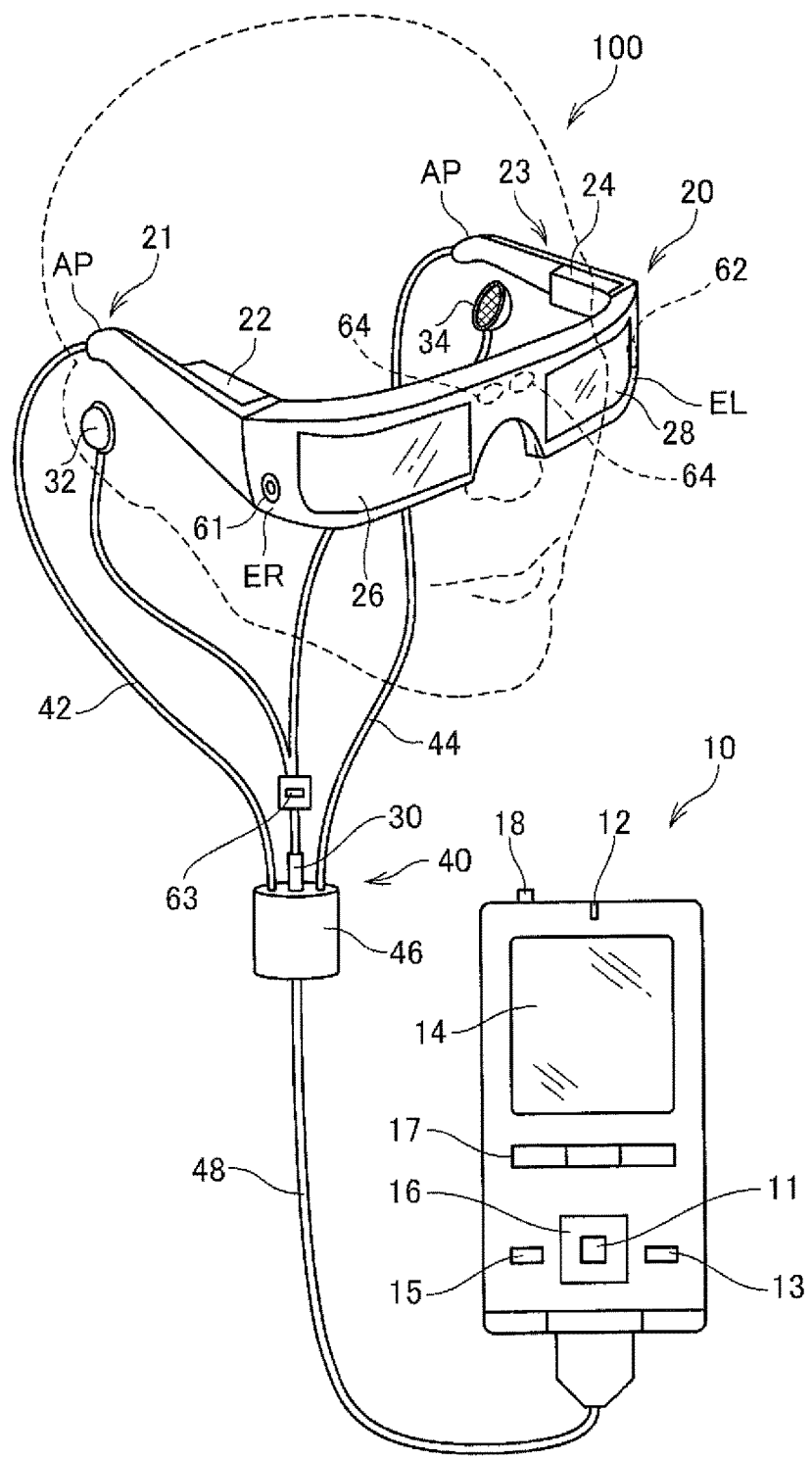
FIG. 3 is a descriptive diagram showing an exterior configuration of a head mounted display.

FIG. 3 is a descriptive diagram showing an exterior configuration of the HMD 100.

The image display section 20 is a wearable member worn around the user's head and has a spectacle-like shape in the present embodiment. The image display section 20 includes a right holder 21, a right display driver 22, a left holder 23, a left display driver 24, a right optical image display section 26, a left optical image display section 28, a right camera 61 (imaging section), a left camera 62 (imaging section), and a microphone 63. The right optical image display section 26 and the left optical image display section 28 are so disposed as to be located in front of the right and left eyes of the user who wears the image display section 20. One end of the right optical image display section 26 and one end of the left optical image display section 28 are linked to each other in a position corresponding to the portion between the eyes of the user who wears the image display section 20.

The right holder 21 is a member extending from an end ER of the right optical image display section 26, which is the other end thereof, to a position corresponding to a temporal region of the user who wears the image display section 20. Similarly, the left holder 23 is a member extending from an end EL of the left optical image display section 28, which is the other end thereof, to a position corresponding to another temporal region of the user who wears the image display section 20. The right holder 21 and the left holder 23, which serve in the same manner as temples (bows) of spectacles do, hold the image display section 20 around the user's head.

The right display driver 22 and the left display driver 24 are disposed on opposite sides of the head of the user who wears the image display section 20. The right display driver 22 and the left display driver 24 are also simply called "display drivers" in a collective manner, and the right optical image display section 26 and the left optical image display section 28 are also simply called "optical image display sections" in a collective manner.

The display drivers 22 and 24 include liquid crystal displays 241 and 242 (hereinafter referred to as "LCDs 241 and 242"), projection systems 251 and 252, which will be described later with reference to FIGS. 4 to 6, and other components.

The right optical image display section 26 and the left optical image display section 28 include light guide plates 261 and 262 (FIG. 4) and a light control plate 20A. The light guide plates 261 and 262 are made, for example, of a light transmissive resin material and guide image light outputted from the display drivers 22 and 24 to the user's eyes. The light control plate 20A is a thin-plate-shaped optical element and so disposed as to cover the front side of the image display section 20, which is opposite the side where the user's eyes are present. The light control plate 20A can be a plate having light transmittance of substantially zero, a nearly transparent plate, a plate that transmits light but attenuates the amount of light, a plate that attenuates or reflects light of a specific wavelength, or any of other variety of optical components. Appropriate selection of optical characteristics (such as light transmittance) of the light control plate 20A allows adjustment of the amount of external light externally incident on the right optical image display section 26 and the left optical image display section 28 and hence adjustment of visibility of a virtual image. In the present embodiment, a description will be made of a case where the light control plate 20A is optically transmissive enough at least to allow the user who wears the HMD 100 to view an outside scene. The light control plate 20A also protects the right light guide plate 261 and the left light guide plate 262 and prevents the right light guide plate 261 and the left light guide plate 262 from being damaged, dirt from adhering thereto, and other defects from occurring.

The light control plate 20A may be configured to be attachable to and detachable from the right optical image display section 26 and the left optical image display section 28, or a plurality of types of light control plate 20A may be exchangeably attachable. The light control plate 20A may even be omitted.

The right camera 61 is disposed on the front surface of the HMD 100 and in an end portion on the side facing the right holder 21. Similarly, the left camera 62 is disposed on the front surface of the HMD 100 and in an end portion on the side facing the left holder 23. Each of the right camera 61 and the left camera 62 is a digital camera including a CCD, a CMOS device, or any other imaging device, an imaging lens, and other components and may be a monocular camera or a stereoscopic camera.

Each of the right camera 61 and the left camera 62 captures an image of at least part of an outside scene present on the front side of the HMD 100, in other words, in the visual field direction of the user who wears the HMD 100. In another expression, at least one of the right camera 61 and the left camera 62 performs image capturing over a range that overlaps with the user's visual field or in the direction thereof. More specifically, at least one of the right camera 61 and the left camera 62 performs image capturing in the direction in which the user gazes. The angle of view of each of the right camera 61 and the left camera 62 can be set at an appropriate value and is, in the present embodiment, an angle of view that covers the outside viewed by the user through the right optical image display section 26 and the left optical image display section 28, as will be described later. Further, it is more preferable that the image capturing range of each of the right camera 61 and the left camera 62 is so set that the camera can perform image capturing over the entire visual field of the user through the light control plate 20A.

Each of the right camera 61 and the left camera 62 performs image capturing under the control of an imaging control section 161 (FIG. 6), which is provided in a control section 140, and outputs captured image data to the imaging control section 161.

Distance sensors 64 are disposed in a portion at the boundary between the right optical image display section 26 and the left optical image display section 28. In a state in which the user wears the image display section 20, the positions of the distance sensors 64 are roughly at the middle between the user's eyes in the horizontal direction but above the user's eyes in the vertical direction.

The distance sensors 64 detect the distance to a target object under measurement located in a preset measurement direction. Each of the distance sensors 64 includes, for example, an LED, a laser diode, or any other light source and a light receiver that receives light emitted from the light source and reflected off the target object under measurement. In this case, the distance sensors 64 perform the distance measurement based on triangulation or time difference under the control of the control section 140. Each of the distance sensors 64 may instead include a sound source that emits an ultrasonic wave and a detector that receives the ultrasonic wave reflected off a target object under measurement. In this case, the distance sensors 64 perform the distance measurement based on the difference in time spent until the ultrasonic wave is reflected under the control of the control section 140. Each of the distance sensors 64 may instead include a light source and a light receiver or a sound source and a detector, and the control section 140 may perform the distance measurement.

The measurement direction of the distance sensors 64 in the present embodiment is the frontward direction from the HMD 100 and coincides with the image capturing direction of the right camera 61 and the left camera 62.

Figure 4:
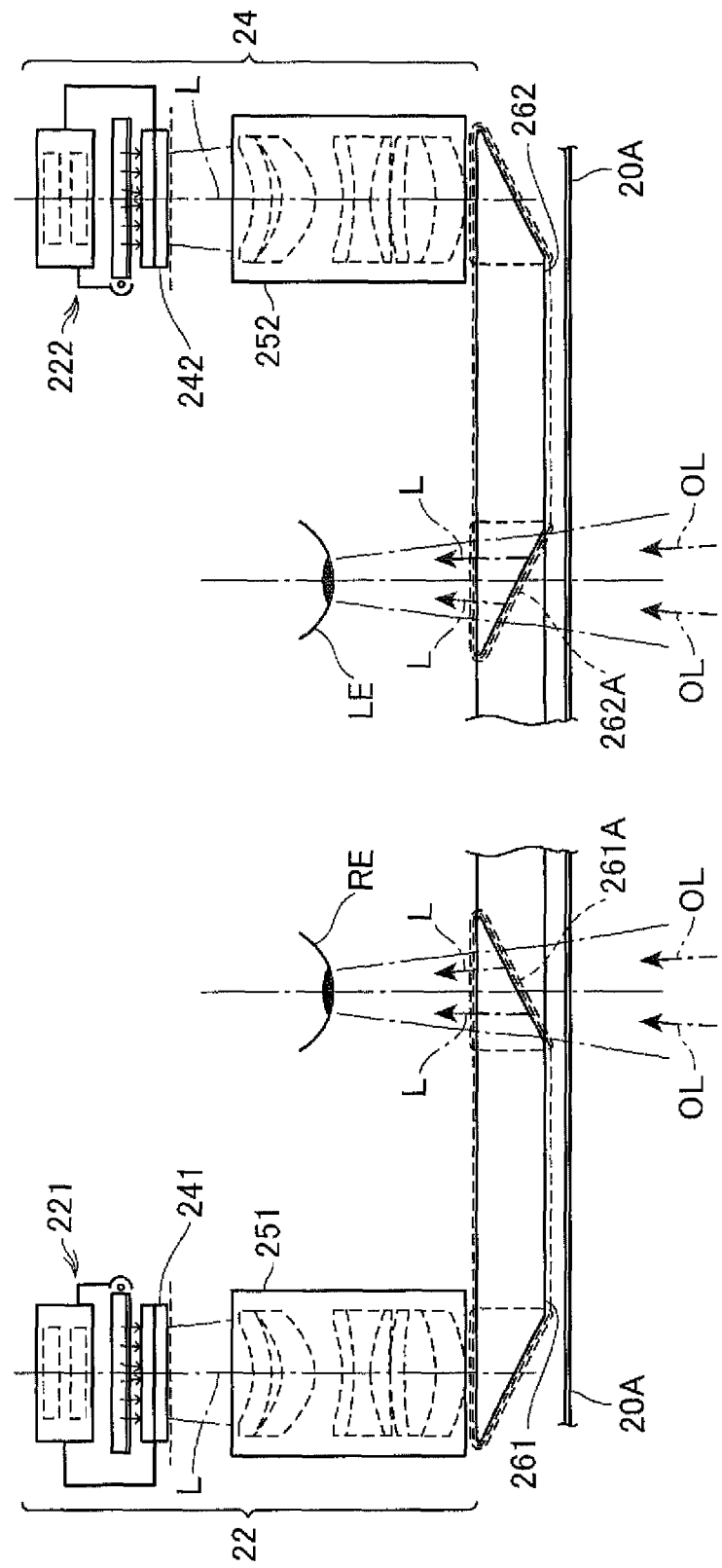
FIG. 4 shows the configuration of an optical system of an image display section.

FIG. 4 is a key portion plan view showing the configuration of an optical system provided in the image display section 20. FIG. 4 shows a user's left eye LE and right eye RE for the description.

The left display driver 24 includes a left backlight 222, which has an LED or any other light source and a diffuser plate, and the left LCD 242, which is a transmissive LCD and disposed in the light path of light having exited out of the diffuser plate of the left backlight 222. The left display driver 24 further includes the left projection system 252, which includes a lens group and other components that guide image light L having passed through the left LCD 242. The left LCD 242 is a transmissive liquid crystal panel having a plurality of pixels arranged in a matrix.

The left projection system 252 has a collimation lens that converts the image light L having exited out of the left LCD 242 into a parallelized light flux. The image light L, which is the parallelized light flux having been converted by the collimation lens, enters the left light guide plate 262. The left light guide plate 262 is a prism having a plurality of reflection surfaces that reflect the image light L, and the image light L is reflected multiple times in the left light guide plate 262 and then guided to the side where the left eye LE is present. The left light guide plate 262 has a half-silvered mirror 262A (reflection surface) formed thereon and disposed in front of the left eye LE.

The image light L reflected off the half-silvered mirror 262A exits out of the left optical image display section 28 toward the left eye LE, and the image light L forms an image on the retina of the left eye LE and allows the user to view the image.

The right display driver 22 is a bilaterally symmetric display driver of the left display driver 24. The right display driver 22 includes a right backlight 221, which has an LED or any other light source and a diffuser plate, and the right LCD 241, which is a transmissive LCD and disposed in the light path of light having exited out of the diffuser plate of the right backlight 221. The right display driver 22 further includes the right projection system 251, which includes a lens group and other components that guide image light L having passed through the right LCD 241. The right LCD 241 is a transmissive liquid crystal panel having a plurality of pixels arranged in a matrix.

The right projection system 251 has a collimation lens that converts the image light L having exited out of the right LCD 241 into a parallelized light flux. The image light L, which is the parallelized light flux having been converted by the collimation lens, enters the right light guide plate 261. The right light guide plate 261 is a prism having a plurality of reflection surfaces that reflect the image light L, and the image light L is reflected multiple times in the right light guide plate 261 and then guided to the side where the right eye RE is present. The right light guide plate 261 has a half-silvered mirror 261A (reflection surface) formed thereon and disposed in front of the right eye RE.

The image light L reflected off the half-silvered mirror 261A exits out of the right optical image display section 26 toward the right eye RE, and the image light L forms an image on the retina of the right eye RE and allows the user to view the image.

On the user's right eye RE are incident the image light L having been reflected off the half-silvered mirror 261A and outside light OL having passed through the light control plate 20A. On the user's left eye LE are incident the image light L having been reflected off the half-silvered mirror 262A and outside light OL having passed through the light control plate 20A. The HMD 100 thus causes the image light L, which carries an internally processed image, and the outside light OL to be superimposed on each other and incident on the user's eyes, whereby the user sees an outside scene through the light control plate 20A and views the image carried by the image light L with the image superimposed on the outside scene. The HMD 100 thus functions as a see-through-type display apparatus.

The left projection system 252 and the left light guide plate 262 are also collectively called a "left light guide unit," and the right projection system 251 and the right light guide plate 261 are also collectively called a "right light guide unit." The configuration of each of the right light guide unit and the left light guide unit is not limited to the example described above and can be arbitrarily configured as long as the image light is used to form a virtual image in front of the user's eyes. For example, a diffraction grating may be used, or a semitransparent reflection film may be used.

The image display section 20 is connected to the control device 10 via a connection section 40. The connection section 40 includes a body cord 48, which is connected to the control device 10, a right cord 42, a left cord 44, and a linkage member 46. The right cord 42 and the left cord 44 are two cords into which the body cord 48 bifurcates. The right cord 42 is inserted into an enclosure of the right holder 21 through a lengthwise end portion AP of the right holder 21 and connected to the right display driver 22. Similarly, the left cord 44 is inserted into an enclosure of the left holder 23 through a lengthwise end portion AP of the left holder 23 and connected to the left display driver 24.

The linkage member 46 is disposed at the point where the body cord 48 bifurcates into the right cord 42 and the left cord 44 and has a jack for connecting an earphone plug 30. A right earphone 32 and a left earphone 34 extend from the earphone plug 30. The microphone 63 is provided in a position in the vicinity of the earphone plug 30. An integrated single cord form the portion from the earphone plug 30 to the microphone 63 and bifurcates at the microphone 63 into two cords connected to the right earphone 32 and the left earphone 34, respectively.

Figure 6:
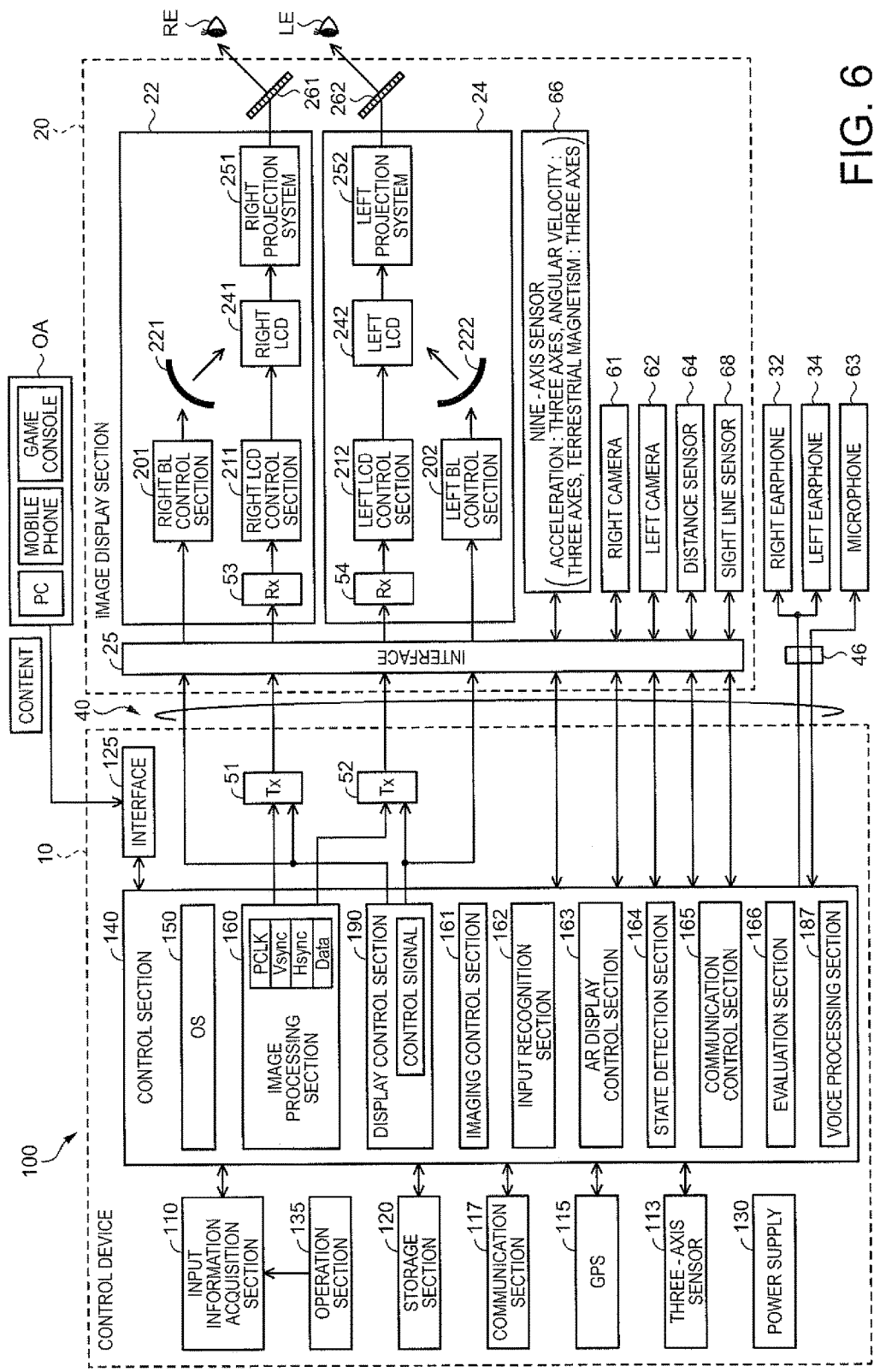
FIG. 6 is a functional block diagram of portions that form the HMD.

The microphone 63 is so disposed that a voice collection portion of the microphone 63 faces the directions of the user's sight lines, as shown, for example, in FIG. 3, and the microphone 63 collects voice and outputs a voice signal to a voice processing section 187 (FIG. 6). The microphone 63 may, for example, a monophonic microphone or a stereophonic microphone. The microphone 63 may be a directional microphone or an omni-directional microphone.

Each of the right cord 42, the left cord 44, and the body cord 48 may be any cord capable of transporting digital data and can be formed, for example, of a metal cable or an optical fiber. The right cord 42 and the left cord 44 may be integrated into a single cord.

The image display section 20 and the control device 10 transport a variety of signals to each other via the connection section 40. Connectors (not shown) that fit into each other are provided at the end of the body cord 48 on the side opposite the linkage member 46 and at an end of the control device 10. Causing the connector at the body cord 48 and the connector at the control device 10 to fit into each other and detach from each other allows the control device 10 and the image display section 20 to be connected to each other and disconnected from each other.

The control device 10 controls the HMD 100. The control device 10 has a group of switches including a finalizing key 11, a lighting section 12, a display switch key 13, a luminance switch key 15, a direction key 16, a menu key 17, and a power switch 18. The control device 10 further includes a trackpad 14, operated by the user with a finger.

The finalizing key 11 detects pressing operation and outputs a signal that finalizes the content of the operation performed on the control device 10. The lighting section 12 includes a light source, such as an LED (light emitting diode), and notifies the user of the state of action of the HMD 100 (whether the HMD 100 is powered on or off, for example) in the form of the lighting state of the light source. The display switch key 13 outputs a signal that instructs, for example, switching of an image display mode from one to another in accordance with pressing operation performed on the display switch key 13.

The trackpad 14 has an operation surface that detects contact operation and outputs an operation signal according to the operation performed on the operation surface. A method for detecting operation performed on the operation surface is not limited to a specific method and can, for example, be an electrostatic method, a pressure detection method, or an optical method. The luminance switch key 15 outputs a signal that instructs an increase or a decrease in the luminance of an image displayed by the image display section 20 in accordance with pressing operation performed on the luminance switch key 15. The direction key 16 outputs an operation signal in accordance with pressing operation performed on a key corresponding to any of the upward, downward, rightward, and leftward directions. The power switch 18 switches the power on/off state of the HMD 100 from one to the other.

Figure 5A:
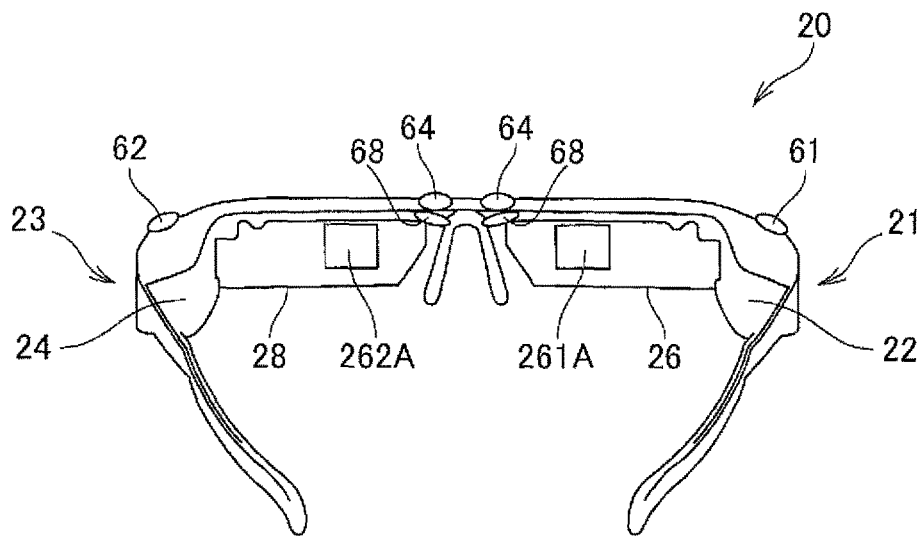
FIGS. 5A and 5B show the configurations of key parts of the image display section.
Figure 5B:
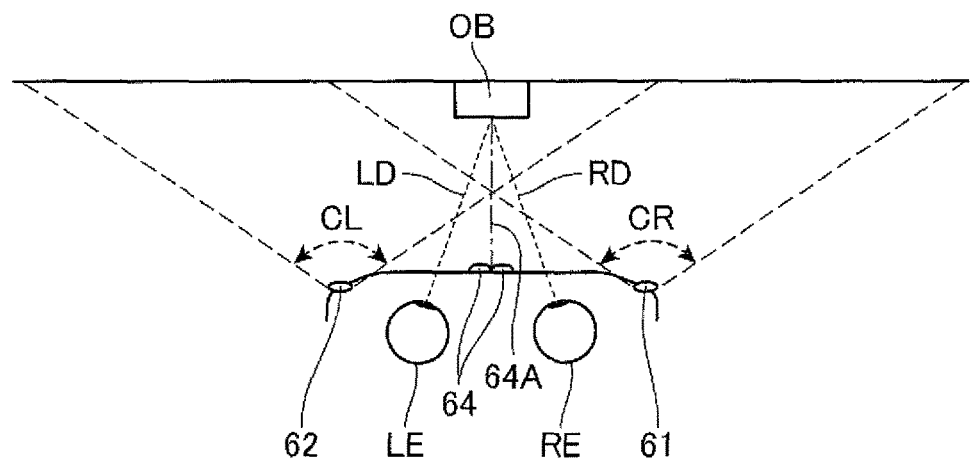

FIGS. 5A and 5B show the configurations of key parts of the image display section 20. FIG. 5A is a perspective view of the key parts in a case where the image display section 20 is viewed from the user's head side, and FIG. 5B is a descriptive diagram of the angles of view of the right camera 61 and the left camera 62. In FIG. 5A, the right cord 42 and the left cord 44, which are tied to the image display section 20, and other components are omitted.

FIG. 5A shows one side of the image display section 20, that is, the side thereof facing the user's head, in other words, the side visible to the user's right eye RE and left eye LE. In another expression, FIG. 5A shows the rear side of the right optical image display section 26 and the left optical image display section 28.

In the HMD 100, the half-silvered mirrors 261A and 262A reflect the image light to the user's eyes to form a display region, as shown in FIG. 5A. In the HMD 100, the half-silvered mirrors 261A and 262A reflect the image light to allow the user's eyes to recognize a virtual image. Therefore, in the present embodiment, the display region is not the half-silvered mirrors 261A and 262A themselves but is a region where the user perceives the image light reflected off the half-silvered mirrors 261A and 262A. In a case where the image display section 20 has a configuration in which images are actually formed on the half-silvered mirrors 261A and 262A, the half-silvered mirrors 261A and 262A serve as the display region. The display region is a region which corresponds to the right LCD 241 and the left LCD 242 and where the user views images displayed on the LCDs 241 and 242. For example, when the right LCD 241 and the left LCD 242 display images over entire regions thereof where images can be displayed (image displayable regions), the user is allowed to view an image of the size of the entire display region.

As described above, the half-silvered mirror 261A, which irradiates the user's right eye RE with the image light, and the half-silvered mirror 262A, which irradiates the user's left eye LE with the image light, allow the user to view a roughly rectangular display image. Further, the entire right optical image display section 26 and left optical image display section 28 including the half-silvered mirrors 261A and 262A transmits outside light, as described above. The user therefore views an outside scene that passes through the entire right optical image display section 26 and left optical image display section 28 and a display image formed by the image light reflected off the half-silvered mirrors 261A and 262A with the outside scene and the display image superimposed on each other.

The right camera 61 is disposed at an end portion facing the right holder 21 and oriented forward with respect to the image display section 20, and the left camera 62 is disposed at an end portion facing the left holder 23, as described above. The distance sensors 64 are disposed at the middle between the right optical image display section 26 and the left optical image display section 28 and oriented forward.

FIG. 5B diagrammatically shows the positions of the right camera 61, the left camera 62, and the distance sensors 64 in a plan view along with the user's right eye RE and left eye LE. In FIG. 5B, CR represents the angle of view (imaging range) of the right camera 61, and CL represents the angle of view (imaging range) of the left camera 62. The angles of view CR and CL shown in FIG. 5B are angles of view in the horizontal direction, and it is noted that actual angles of view of the right camera 61 and the left camera 62 extend also in the upward/downward direction, as in the case of a typical digital camera.

The angles of view CR and CL are bilaterally symmetric with respect to the center position of the image display section 20, and each of the angles of view CR and CL includes a direction passing through a point right in front of the center position of the image display section 20. The angles of view CR and CL therefore overlap with each other in front of the center position of the image display section 20.

For example, when a target OB is located in front of the image display section 20, the target OB falls within both the angles of view CR and CL, as shown in FIG. 5B. The target OB is therefore displayed in both an image captured with the right camera 61 and an image captured with the left camera 62. In this case, when the user gazes the target OB, the user's sight lines are directed to the target OB, as indicated by the reference characters RD and LD in FIG. 5B. In general, it is believed that the angle of field of a person is about 200 degrees in the horizontal direction and about 125 degrees in the vertical direction. Within these ranges, an effective field of view where a person has excellent information reception capability extends over a horizontal range of about 30 degrees and a vertical range of about 20 degrees. Further, it is believed that a stable field of fixation where a point of fixation at which a person gazes in a quick, stable manner extends over a horizontal range from about 60 to 90 degrees and a vertical range from about 45 to 70 degrees.

Therefore, when a point of fixation coincides with the target OB, the effective field of view extends over about 30 degrees in the horizontal direction and about 20 degrees in the vertical direction, the stable field of fixation extends over about 60-90 degrees in the horizontal direction and about 45-70 degrees in the vertical direction, and the angle of field is about 200 degrees in the horizontal direction and about 125 degrees in the vertical direction, over portions on both sides of the sight lines RD and LD.

Further, an actual field of view viewed by the user who wears the HMD 100 through the image display section 20 and further through the right optical image display section 26 and the left optical image display section 28 is called an actual field of view (FOV). In the configuration of the present embodiment, the actual field of view corresponds to a field of view actually viewed by the user through the right optical image display section 26 and the left optical image display section 28 (field of view VR, which will be described later). The actual field of view is narrower than the angle of field and the stable field of fixation, which have been described with reference to FIG. 5B, but wider than the effective field of view.

Each of the right camera 61 and the left camera 62 is preferably capable of image capturing over a range wider than the user's field of view. Specifically, the sum of the angles of view CR and CL is preferably wider than at least the user's effective field of view. More preferably, the sum of the angles of view CR and CL is wider than the user's actual field of view. Still more preferably, the sum of the angles of view CR and CL is wider than the user's stable field of fixation. Most preferably, the sum of the angles of view CR and CL is wider than the user's angle of the field.

To this end, the right camera 61 and the left camera 62 are so disposed that the angles of view CR and CL overlap with each other in front of the image display section 20, as shown in FIG. 5B. Each of the right camera 61 and the left camera 62 may be formed of a wide-angle camera. That is, each of the right camera 61 and the left camera 62 may include what is called a wide-angle lens as the imaging lens for image capturing over a wide angle of view. The wide-angle lens may include a lens called a super-wide-angle lens or a semi-wide-angle lens or may be a fixed-focal-length lens or a zoom lens, or each of the right camera 61 and the left camera 62 may include a lens group formed of a plurality of lenses. Further, the angle of view CR of the right camera 61 may not be equal to the angle of view CL of the left camera 62. Moreover, the imaging direction of the right camera 61 is not necessarily completely parallel to the imaging direction of the left camera 62. The right camera 61 and the left camera 62 only need to perform image capturing in such a way that the combination of an image captured with the right camera 61 and an image captured with the left camera 62 is wider than the user's field of view.

In FIG. 5B, the reference character 64A denotes the detection direction of the distance sensors 64. In the present embodiment, the distance sensors 64 are configured to be capable of detecting the distance from the center position of the image display section 20 to an object located in front thereof and, for example, detects the distance to the target OB. Since the user who wears the HMD 100 orients the head in a gazing direction, a target to be gazed is considered to be located in front of the image display section 20. The distance sensors 64, which are disposed at the center of the image display section 20, can therefore detect the distance to a target gazed by the user, provided that the detection direction 64A coincides with the forward direction with respect to the image display section 20.

Further, sight line sensors 68 are disposed on the user's side of the image display section 20, as shown in FIG. 5A. The sight line sensors 68 are provided as a pair in correspondence with the user's right eye RE and left eye LE in positions at the middle between the right optical image display section 26 and the left optical image display section 28. The sight line sensors 68 are formed, for example, of a pair of cameras that captures images of the user's right eye RE and left eye LE. The sight line sensors 68 perform image capturing under the control of the control section 140 (FIG. 6), and the control section 140 detects, from captured image data, light reflected off the eyeball surfaces of the right eye RE and the left eye LE and images of the pupils to identify the directions of the sight lines.

FIG. 6 is a functional block diagram of portions that form the HMD 100.

The HMD 100 includes an interface 125, which connects a variety of external apparatus OA, which serve as content supply sources, to the HMD 100. The interface 125 can be an interface that supports wired connection, such as a USB interface, a micro-USB interface, and a memory card interface, and may instead be formed of a wireless communication interface. The external apparatus OA are each an image supply apparatus that supplies the HMD 100 with images and are, for example, a personal computer (PC), a mobile phone terminal, and a mobile game console.

The control device 10 includes the control section 140, an input information acquisition section 110, a storage section 120, a transmitter (Tx) 51, and a transmitter (Tx) 52.

The input information acquisition section 110 is connected to an operation section 135. The operation section 135 includes the trackpad 14, the direction key 16, the power switch 18, and other components described above, and the input information acquisition section 110 acquires an input content on the basis of a signal inputted through the operation section 135. The control device 10 further includes a power supply section (not shown) that supplies the portions in the control device 10 and the image display section 20 with electric power.

The storage section 120 is a nonvolatile storage device and stores a variety of computer programs and data associated with the programs. The storage section 120 may further store data on still images and motion images to be displayed in the image display section 20.

The storage section 120 further stores setting data 121. The setting data 121 contains a variety of setting values used by the control section 140. The setting values contained in the setting data 121 may be values having been inputted in advance through operation of the operation section 135 or may be values received from any of the external apparatus OA or any other device (not shown) via a communication section 117 or the interface 125 and then stored.

The storage section 120 further stores a variety of data transmitted and received by the HMDs 100A, 100B, and 100C.

Figure 7:
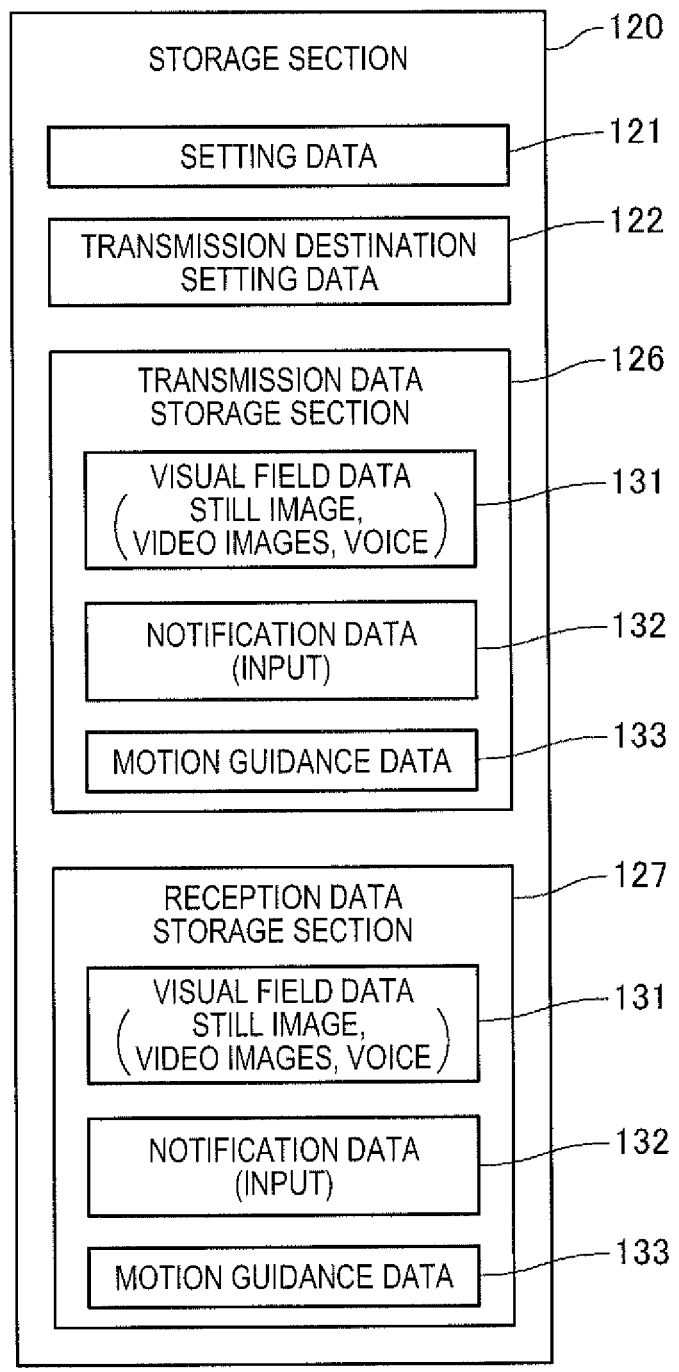
FIG. 7 is a diagrammatic view showing data stored in a storage section.

FIG. 7 diagrammatically shows data stored in the storage section 120.

The storage section 120 stores the setting data 121 and transmission destination setting data 122. The storage section 120 has a transmission data storage section 126 and a reception data storage section 127 as a storage region where data is stored. The transmission data storage section 126 and the reception data storage section 127 can be provided by virtual or logical partition of the storage region and therefore do not need to be classified, for example, as hardware.

The transmission data storage section 126 stores data transmitted by the HMD 100 to another HMD 100. That is, data stored in the transmission data storage section 126 is transmitted via the communication section 117 to another HMD 100. On the other hand, the reception data storage section 127 stores data received through the communication section 117. The data received through the communication section 117 is data transmitted from another HMD 100 over the communication network 4.

The transmission data storage section 126 stores visual field data 131, notification data 132, and action guidance data 133 as data to be transmitted. The reception data storage section 127 stores visual field data 131, notification data 132, and action guidance data 133 received through the communication section 117.

The visual field data 131, the notification data 132, and the action guidance data 133 stored in the transmission data storage section 126 may be identical to the visual field data 131, the notification data 132, and the action guidance data 133 stored in the reception data storage section 127. The data described above stored in the transmission data storage section 126 may differ from the data stored in the reception data storage section 127 in terms of header, attribute, data format, and other factors.

The visual field data 131 is part of image data captured with the right camera 61 and the left camera 62, that is, data cut therefrom or image data containing the entire captured image data. That is, the visual field data 131 corresponds to an image of the outside that the user looks at, that is, an image of the visual field. The visual field data 131 may contain still image data, motion image (video image) data, and voice data. The visual field data 131 may instead contain voice data but no image data. The HMD 100 can transmit an image of the outside (visual field) that the user looks at by transmitting the visual field data 131. Further, the HMD 100 can recreate the visual field that the user of another HMD 100 looks at by reproducing and displaying the visual field data 131 transmitted from the other HMD 100.

The notification data 132 contains data representing a content inputted in the HMD 100. The input to the HMD 100 is, for example, an input through operation of the control device 10, a voice input using voice recognition, an input using knock operation on the image display section 20, a gesture input achieved by placing a hand or any other indicating tool in the imaging ranges of the right camera 61 and the left camera 62, as will be described later. The HMD 100 can transmit the input content to another HMD 100 by transmitting the notification data 132. Further, the HMD 100 allows the user to grasp the content of an input in another HMD 100 by performing display based on the notification data 132 transmitted from another HMD 100.

FIGS. 8A and 8B are diagrammatic views showing an example of the configuration of the data stored in the storage section 120. FIG. 8A shows an example of the transmission destination setting data 122, and FIG. 8B shows an example of the configuration of the motion guidance data 133.

The transmission destination setting data 122 is data that specifies the destination to which the HMD 100 transmits data. In the display system 1 shown in FIG. 1, the HMDs 100A, 100B, and 100C can set different constraints on the destination to which data is transmitted. For example, the HMD 100A is worn and used by the administrator UA, and the HMDs 100B and 100C are worn by the workers UB and UC. The destination to which data is transmitted can be set in accordance with whether the user of the HMD is the administrator or a worker. In the transmission destination setting data 122, an ID that identifies an HMD 100 that is the transmission destination and the type of data to be transmitted are set in relation to each other.

FIG. 8A shows an example of the transmission destination setting data 122 in the HMD 100B used by the worker UB. The HMD 100B can transmit the visual field data 131 and the notification data 132 to the HMD 100A (ID: 0001 in FIG. 8A). The HMD 100B can transmit only the notification data 132 to the HMD 100C (ID: 0003 in FIG. 8A).

As a similar setting, for example, the transmission destination setting data 122 stored in the HMD 100A is so set that notification data can be transmitted to the HMDs 100B and 100C. Further, for example, in the transmission destination setting data 122 stored in the HMD 100C, the visual field data 131 and the notification data 132 can be transmitted to the HMD 100A and the notification data 132 can be transmitted to the HMD 100B.

The transmission destination setting data 122 may instead be data that makes setting of part of data stored and transmitted by the HMD 100. For example, the motion guidance data 133, which will be described later, can be configured not to be under constraint set by the transmission destination setting data 122 but to be transmittable to another HMD 100 in the display system 1.

The motion guidance data 133 is data for displaying motion guidance or outputting voice to the user who wears an HMD 100. The motion guidance data 133 contains guidance information 133a, which gives guidance on the contents of actions, order information 133b, which specifies the order in accordance with which the actions are performed, and state information 133c, which shows the state of the performed actions, as shown in FIG. 8B.

The action performing order shown by the order information 133b is a relative action order, and when the number of actions contained in the action guidance data 133 is one, no order needs to be set in relation thereto.

Each action contained in the action guidance data 133 is given an item (title). In the example shown in FIG. 8B, an item that also serves as the order information 133b is given as follows: work 1, work 2, . . . . An action refers to an act or conduct performed by a user and may be a body motion of the user or may include thought and judgment. One action in the action guidance data 133 may in practice correspond to a sequence including a plurality of actions.

The guidance information 133a contains a text, a still image, video images, voice, and other types of information outputted to the user who performs an action to describe or otherwise convey the content of the action.

The state information 133c is data on the history of each performed action contained in the action guidance data 133. For example, the state information 133c is data on a progress history and a performing history of the guidance information 133a. In the example shown in FIG. 8B, the state information 133c is set to show "complete" representing that an action is complete, "under execution" representing a state in which an action has been initiated but has not been completed, and "not executed" representing that an action has not been initiated.

The state information 133c changes with the progress of an action performed by the user. The state information 133c is updated in accordance with the progress of an action under the control of the control section 140, as will be described later.

To the control section 140 are connected a three-axis sensor 113, a GPS 115, the communication section 117, and a voice recognition section 114. The three-axis sensor 113 is a three-axis acceleration sensor, and the control section 140 acquires a detection value from the three-axis sensor 113. The three-axis sensor 113 allows the control section 140 to detect the motion of the control device 10, for example, detect operation of swinging or otherwise moving the control device 10. The three-axis sensor 113 may be replaced with a nine-axis sensor. In this case, the control section 140 can acquire detection values from a three-axis acceleration sensor, a three-axis angular velocity sensor, and a three-axis terrestrial magnetism sensor to detect, for example, the attitude, orientation, and motion, of the control device 10.

The GPS 115 includes an antenna (not shown) and receives a GPS (global positioning system) signal to calculate the current position of the control device 10. The GPS 115 outputs the current position and the current time determined on the basis of the GPS signal to the control section 140. The GPS 115 may further have a function of acquiring the current time on the basis of information contained in the GPS signal to correct the time measured by the control section 140.

The communication section 117 performs wireless data communication that complies with wireless LAN (WiFi (registered trademark)), Miracast (registered trademark), Bluetooth (registered trademark), or any other standard.

When the external apparatus OA is wirelessly connected to the communication section 117, the control section 140 acquires content data via the communication section 117 and causes the image display section 20 to display an image. On the other hand, when the external apparatus OA is wired to the interface 125, the control section 140 acquires content data via the interface 125 and causes the image display section 20 to display an image. The communication section 117 and the interface 125 function as a data acquisition section DA, which acquires content data from the external apparatus OA.

The control section 140 includes a CPU (not shown) that executes a program, a RAM (not shown) that temporarily stores the program executed by the CPU and data, and a ROM (not shown) that stores a basic control program executed by the CPU and data in a nonvolatile manner. The control section 140 reads and executes the computer programs stored in the storage section 120 to function as an operating system (OS) 150 and an image processing section 160. The control section 140 further functions as the imaging control section 161, an input recognition section 162 (recognition section), an AR display control section 163, a state detection section 164, a communication control section 165, an evaluation section 166, the voice processing section 187, and a display control section 190.

The image processing section 160 acquires an image signal contained in a content. The image processing section 160 separates a vertical sync signal. VSync, a horizontal sync signal HSync, and other sync signals from the acquired image signal. Further, the image processing section 160 produces a clock signal PCLK, for example, by using a PLL (phase locked loop) circuit (not shown) in accordance with the cycles of the separated vertical sync signal VSync and horizontal sync signal HSync. The image processing section 160 converts the analog image signal from which the sync signals are separated into a digital image signal, for example, by using an A/D conversion circuit (not shown). The image processing section 160 then stores the converted digital image signal as image data on a target image (Data in FIG. 6) in the RAM in the control section 140 on a frame basis. The image data is, for example, RGB data.

The image processing section 160 may perform, as required, resolution conversion in which the resolution of the image data is converted into resolution suitable for the right display driver 22 and the left display driver 24. The image processing section 160 may further perform image adjustment in which the luminance and chroma of the image data are adjusted, 2D/3D conversion in which 2D image data is created from 3D image data or 3D image data is created from 2D image data.

The image processing section 160 transmits the clock signal PCLK, the vertical sync signal VSync, the horizontal sync signal HSync, and the image data Data stored in the RAM via the transmitters 51 and 52. Each of the transmitters 51 and 52 functions as a transceiver for serial transportation between the control device 10 and the image display section 20. The image data Data transmitted via the transmitter 51 is also called "image data for the right eye," and the image data Data transmitted via the transmitter 52 is also called "image data for the left eye."

The display control section 190 produces control signals that control the right display driver 22 and the left display driver 24, and the control signals control the right display driver 22 and the left display driver 24 to cause them to produce and output image light. Specifically, the display control section 190 controls a right LCD control section 211 to cause it to drive the right LCD 241 or not and controls a right backlight control section 201 to cause it to drive the right backlight 221 or not. The display control section 190 further controls a left LCD control section 212 to cause it to drive the left LCD 242 or not and controls a left backlight control section 202 to cause it to drive the left backlight 222 or not.

The voice processing section 187 acquires a voice signal contained in the content, amplifies the acquired voice signal, and outputs the amplified voice signal to the right earphone 32 and the left earphone 34. The voice processing section 187 further acquires voice collected through the microphone 63 and converts the collected voice into digital voice data. The voice processing section 187 may perform preset processing on the digital voice data.

The image display section 20 includes the right camera 61, the left camera 62, and the distance sensors 64 described above. The image display section 20 further includes an interface 25, the right display driver 22, the left display driver 24, the right light guide plate 261 as the right optical image display section 26, the left light guide plate 262 as the left optical image display section 28, a nine-axis sensor 66, and the sight line sensors 68.

The nine-axis sensor 66 (motion detection section) is a motion sensor that detects acceleration (three axes), angular velocity (three axes), and terrestrial magnetism (three axes). The control section 140 can detect motion of the head of the user who wears the image display section 20 around the head on the basis of a detection value from the nine-axis sensor 66. For example, the control section 140 can estimate the magnitude of inclination of the image display section 20 and the orientation of the inclination on the basis of a detection value from the nine-axis sensor 66.

The interface 25 includes a connector to which the right cord 42 and the left cord 44 are connected. The interface 25 outputs the clock signal PCLK, the vertical sync signal VSync, the horizontal sync signal HSync, and the image data Data transmitted from the transmitters 51 and 52 to corresponding receivers (Rx) 53 and 54. The interface 25 further outputs the control signals transmitted from the display control section 190 to the corresponding receivers 53, 54, right backlight control section 201, or left backlight control section 202.

The interface 25 is an interface that connects the right camera 61, the left camera 62, the distance sensors 64, the nine-axis sensor 66, and the sight line sensors 68 to the control section 140. Image data captured with the right camera 61 and the left camera 62, a result of detection performed by the distance sensors 64, a result of detection of acceleration (three axes), angular velocity (three axes), and terrestrial magnetism (three axes) from the nine-axis sensor 66, and a result of detection performed by the sight line sensors 68 are sent to the control section 140 via the interface 25.

The right display driver 22 includes the right backlight 221, the right LCD 241, and the right projection system 251 described above. The right display driver 22 further includes the receiver 53, the right backlight (BL) control section 201, which controls the right backlight (BL) 221, and the right LCD control section 211, which drives the right LCD 241.

The receiver 53 operates as a receiver corresponding to the transmitter 51 and performs serial transportation between the control device 10 and the image display section 20. The right backlight control section 201 drives the right backlight 221 on the basis of the inputted control signal. The right LCD control section 211 drives the right LCD 241 on the basis of the clock signal PCLK, the vertical sync signal VSync, the horizontal sync signal HSync, and the image data Data for the right eye, which are inputted via the receiver 53.

The left display driver 24 has the same configuration as that of the right display driver 22. The left display driver 24 includes the left backlight 222, the left LCD 242, and the left projection system 252 described above. The left display driver 24 further includes the receiver 54, the left backlight control section 202, which drives the left backlight 222, and the left LCD control section 212, which drives the left LCD 242.

The receiver 54 operates as a receiver corresponding to the transmitter 52 and performs serial transportation between the control device 10 and the image display section 20. The left backlight control section 202 drives the left backlight 222 on the basis of the inputted control signal. The left LCD control section 212 drives the left LCD 242 on the basis of the clock signal PCLK, the vertical sync signal VSync, the horizontal sync signal HSync, and the image data Data for the left eye, which are inputted via the receiver 54.

The right backlight control section 201, the right LCD control section 211, the right backlight 221, and the right LCD 241 are also collectively referred to as a right "image light generation unit." Similarly, the left backlight control section 202, the left LCD control section 212, the left backlight 222, and the left LCD 242 are also collectively referred to as a left "image light generation unit."

The imaging control section 161 controls the right camera 61 and the left camera 62 to cause them to perform image capturing for captured image data acquisition. The imaging control section 161 may cause only one of the right camera 61 and the left camera 62 to perform image capturing or may cause both the right camera 61 and the left camera 62 to perform image capturing.

The input recognition section 162 detects and recognizes an input to the HMD 100. The input recognition section 162 detects operation performed on the operation section 135 on the basis of a signal inputted from the input information acquisition section 110. Further, when the voice processing section 187 analyzes voice collected through the microphone 63, and a result of the analysis shows that the voice is a voice command set in advance, the input recognition section 162 detects the input of the voice command. Further, when the input recognition section 162 detects an image of an indicating tool, such as the user's hand, from images captured with the right camera 61 and/or the left camera 62 and determines that the position, orientation, or motion of the indicating tool corresponds to a gesture set in advance, the input recognition section 162 detects the gesture input. Further, when the input recognition section 162 determines that a pattern of detection signals from the nine-axis sensor 66 provided in the image display section 20 corresponds to operation of knocking the image display section 20, the input recognition section 162 detects that the knock operation on the image display section 20 as an input. Further, when the input recognition section 162 detects an image of an input marker, such as a two-dimensional code or a barcode, from images captured with the right camera 61 and/or the left camera 62, the input recognition section 162 detects the marker reading input. When the input recognition section 162 detects an indicating tool or a marker from image data captured with the right camera 61 and/or the left camera 62, the input recognition section 162 may detect that the indicating tool or marker corresponding to the direction of the user's sight lines detected with the sight line sensors 68.

The HMD 100 may include a foot switch (not shown) operated by the user with a foot. The foot switch may be wired to the control section 140 or the operation section 135 or may be connected to the communication section 117 over wireless communication, such as Bluetooth (registered trademark). In this case, the input recognition section 162 detects operation of the foot switch and recognizes the operation as an input.

The AR display control section 163 reads data stored in the storage section 120 and controls the image processing section 160 and the display control section 170 to cause the image display section 20 to display an image or a text. The AR display control section 163 may AR-display, 3D-display (stereoscopically display), or 2D-display (planarly display) the image or the text in a position that coincides with the position of a target in an actual space present in the user's field of view. Further, the AR display control section 163 may control the voice processing section 187 on the basis of the data read from the storage section 120 to cause the right earphone 32 and the left earphone 34 to output voice.

Specifically, the AR display control section 163 displays a still image or video images in the visual field of a user of another HMD 100 on the basis of the visual field data 131 stored in the reception data storage section 127. Voice may be further outputted in this process.

The AR display control section 163 further reads the action guidance data 133 in the reception data storage section 127 and displays a still image, motion images, a text, or any other type of information that gives guidance on an action on the basis of the action guidance data 133. In this process, the AR display control section 163 may display the contents of guidance information 133a corresponding to a plurality of actions in the form of a list in which the contents of information are arranged in accordance with the order specified by the order information 133b. The AR display control section 163 may instead display the contents of guidance information 133a by switching one content to another or one set of a preset number of contents to another set in accordance with the order specified by the order information 133b.

The state detection section 164 detects the state of a performed action (work) corresponding to the guidance information 133a in the action guidance data 133 during a period for which the AR display control section 163 performs display based on the action guidance data 133.

The performed action state detection performed by the state detection section 164 is performed, for example, by analysis of image data captured with the right camera 61 and/or the left camera 62. In this case, the state detection section 164 detects at least one of a target on which an action is performed, a gadget or a tool used to perform the action, the user's body part, or any other object from the captured image data. The state detection section 164 generates data on the state of the performed action on the basis of the position, size, color, shape, and other factors of the target on which the action is performed, the gadget or the tool used to perform the action, the user's body part, or any other object.

Instead, in the state in which the AR display control section 163 displays an item in the action guidance data 133, the state detection section 164 may detect the state of a performed action corresponding to the item on the basis of an input detected by the input recognition section 162.

When the input recognition section 162 detects an indicating tool or a marker from image data captured with the right camera 61 and/or the left camera 62, a characteristic quantity set in advance may be used. The same holds true for the case where the state detection section 164 detects the position, size, color, shape, and other factors of a target on which an action is performed, a gadget or a tool used to perform the action, the user's body part, or any other object from image data captured with the right camera 61 and/or the left camera 62. The characteristic quantity is data used to detect an image from a captured image and is a characteristic quantity or any other parameter of the image. For example, to detect a target that is an object, the setting data contains a characteristic quantity representing the color, shape, or any other characteristic of a captured image of the object. In this case, the input recognition section 162 and the state detection section 164 extract an image of the object from image data on an outside scene image, calculate a characteristic quantity of the extracted image of the object, and compare the calculated characteristic quantity with the characteristic quantity contained in the setting data 121 and verify the degree of coincidence. When the comparison shows close similarity or complete coincidence, the object in the image extracted from the outside scene image can be recognized as the target. When the setting data 121 contains a plurality of characteristic quantities of a target, the input recognition section 162 and the state detection section 164 can detect the target from an outside scene image on the basis of the plurality of characteristic quantities and recognize the target.

How the input recognition section 162 and the state detection section 164 recognize a target and an indicating tool from an image is not limited to the method for recognizing an image of the target on the basis of a characteristic quantity of the image as described above. For example, the user may indicate a target or an indicating tool, for example, from objects contained in an outside scene image to select the target or the indicating tool. In this case, the indication performed by the user may be voice indication, and the voice processing section 187 converts the voice collected through the microphone 63 into a text, which allows the input recognition section 162 and the state detection section 164 to acquire information for recognition and identification of the target. For example, when voice that specifies a characteristic of a target in a captured image, such as the color or the shape of the target, is converted into a text, the input recognition section 162 and the state detection section 164 detect an image corresponding to the specified characteristic from the captured image and recognize the image. A method for inputting information on a target can be a method using an input detectable by the input recognition section 162, as described above.

The evaluation section 166 evaluates the state of a user of the HMD 100. More specifically, the evaluation section 166 evaluates whether or not the state of the user is a state in which the notification data 132 should be transmitted from the HMD 100 to another HMD 100. The reference in accordance with or the condition under which it is determined that the notification data 132 should be transmitted is set in advance and stored, for example, in the storage section 120 as the setting data. For example, the reference in accordance with which the determination is made can be a situation in which the input recognition section 162 has detected and recognized a predetermined input. In this case, when the input recognition section 162 has recognized an input corresponding to a condition set in advance, the evaluation section 166 determines that the user's state is the state in which the notification data 132 should be transmitted.

The reference or the condition used by the evaluation section 166 for the evaluation is not limited to a content relating to an input recognized by the input recognition section 162. For example, the evaluation section 166 may evaluate whether or not motion of the user's head or body corresponds to preset motion on the basis of a detection value from the nine-axis sensor 66. Instead, the evaluation section 166 may evaluate whether or not motion of the user's sight lines corresponds to preset motion on the basis of a detection value from the sight line sensors 68. Still instead, the HMD 100 may be provided with a vital sensor, such as an electromyograph (not shown), a pulse measurement apparatus (not shown), a blood pressure measurement apparatus (not shown), or a blood oxygen level measurement apparatus (not shown), and the evaluation section 166 may perform the evaluation on the basis of a measurement value or a detection value from the vital sensor. In any of these cases, even when the user has no intention of transmitting the notification data 132, the state of the user's body can be evaluated. For example, when the user desires to transmit the notification data 132 but cannot issue an input recognizable by the input recognition section 162, the evaluation section 166 can evaluate the user's state.

Further, the evaluation section 166 may learn an input recognized by the input recognition section 162, detection values from the nine-axis sensor 66 and the sight line sensors 68, and a detection value from the vital sensor and set or change the reference in accordance with or the condition under which the user's state is evaluated. The learning may be autonomous learning by providing the evaluation section 166 with an AI (artificial intelligence) engine. The evaluation section 166 may instead optimize the evaluation reference or condition in accordance with an algorithm set by the evaluation section 166 in advance.

In the example shown in FIG. 2, when a problem occurs in the work performed by the worker UB, it is appropriate that the worker UB transmits the notification data 132 to the administrator UA or the worker UC, but it is conceivable that the worker UB is absorbed in solving the problem and does not operate the HMD 100. In this case, evaluation of the state of the worker UB allows not only detection of occurrence of a problem in the work line and identification of the location where the problem has occurred but also assistance or other countermeasures taken by another worker or the administrator. Subsequent transmission of the notification data 132 and images captured with the right camera 61 and/or the left camera 62 allows the administrator UA or the worker UC other than the worker UB, who is the person in trouble, to quickly grasp the situation of the problem having occurred.

The communication control section 165 controls the communication section 117 to cause it to perform wireless communication with a wireless access point (not shown) or any other device connected to the communication network 4.

When the plurality of HMDs 100 that form the display system 1 are located in positions close to one another, that is, when the plurality of HMDs 100 are located in a range over which the communication section 117 of one of the HMDs 100 can transmit and receive a wireless signal to and from the communication section 117 of another HMD 100, direct wireless communication between the communication sections 117 may be performed without via the communication network 4.

Figures 9A, 9B:
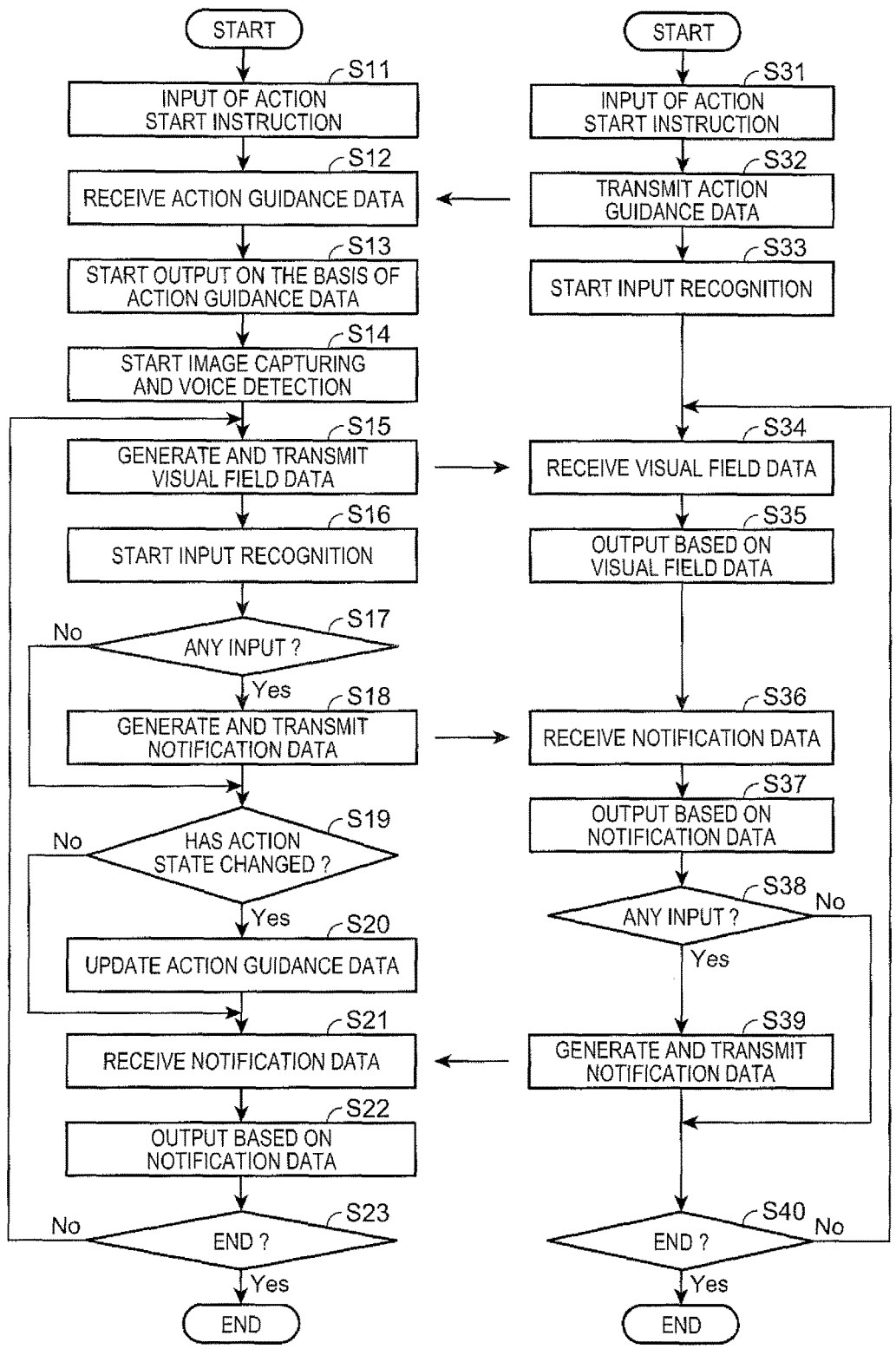
FIGS. 9A and 9B are flowcharts showing the action of the display system.

FIGS. 9A and 9B are flowcharts showing the action of the display system 1.

The following description will be made of the case where the administrator UA, who administers work, wears and uses the HMD 100A, the worker UB wears and uses the HMD 100B, and the worker 15C wears and uses the HMD 100C, as shown in FIGS. 1 and 2.

FIG. 9A shows the action of the HMD 100B, and FIG. 9B shows the action of the HMD 100A.

To start work, an action start instruction is inputted to the HMD 100A (step S31), and the action start instruction is inputted also to the HMD 100B (step S11).

The HMD 100A transmits the action guidance data 133 stored in advance in the transmission data storage section 126 (step S32), and the HMD 100B receives the action guidance data 133 and stores it in the reception data storage section 127 (step S12).

The AR display control section 163 of the HMD 100B starts, for example, displaying a still image, motion images, a text, or any other type of information and/or outputting voice on the basis of the action guidance data 133 in the reception data storage section 127 (step S13). The worker UB, who wears the HMD 100B, can therefore perform work on the target OB (FIG. 2) in accordance with guidance based on the action guidance data 133.

The input recognition section 162 of the HMD 100B starts image capturing by using the right camera 61 and/or the left camera 62 and voice detection by using the voice processing section 187 when the work starts (step S14).

The HMD 100B uses the function of the input recognition section 162 to generate the visual field data 131 from image data captured with the right camera 61 and/or the left camera 62, stores the visual field data 131 in the transmission data storage section 126, and transmits the visual field data 131 to the HMD 100A (step S15). The cycle of the generation and transmission of the visual field data 131 is specified by data contained in the action guidance data 133 or the setting data 121.

The input recognition section 162 evaluates whether or not an input has been detected (step S17). When an input has been detected (step S17: YES), the input recognition section 162 generates notification data 132 corresponding to the content of the input, stores the notification data 132 in the transmission data storage section 126, transmits the notification data 132 to the HMD 100A (step S18), and transitions to step S19. When a result of the evaluation shows that no input has been detected (step S17: NO), the input recognition section 162 transitions to step S19.

In step S19, the state detection section 164 evaluates whether or not the action state has changed (step S19). When the action state has changed (step S19: YES), for example, when an action has been initiated or when an action has been completed, the state detection section 164 updates the state information 133c in the action guidance data 133 stored in the reception data storage section 127 (step S20) and transitions to step S21. When the action state has not changed (step S19: NO), the state detection section 164 transitions to step S21.

When the visual field data 131 has been transmitted from the HMD 100B to the HMD 100A, the HMD 100A receives the visual field data 131 and stores it in the reception data storage section 127 (step S34). The AR display control section 163 of the HMD 100A outputs a still image, motion images, voice, or any other type of information corresponding to the visual field of the worker UB who wears the HMD 100B on the basis of the received visual field data 131 (step S35).

When the HMD 100B has transmitted the notification data 132 to the HMD 100A, the HMD 100A receives the notification data 132 and stores it in the reception data storage section 127 (step S36). The AR display control section 163 of the HMD 100A outputs a text, a still image, motion images, voice, or any other type of information representing the content of the input in the HMD 100B on the basis of the received notification data 132 (step S37).

The input recognition section 162 of the HMD 100A evaluates whether or not an input has been detected (step S38). When an input has been detected (step S38: YES), the input recognition section 162 generates notification data 132 corresponding to the content of the input, stores the notification data 132 in the transmission data storage section 126, transmits the notification data 132 to the HMD 100B (step S39), and transitions to step S40. When a result of the evaluation shows that no input has been detected (step S38: NO), the input recognition section 162 transitions to step S40.

In step S39, the input recognition section 162 of the HMD 100A may transmit the notification data 132 to the plurality of HMDs 100B and 100C at the same time. In this case, the same notification data 132 may be transmitted to the plurality of HMDs 100B and 100C, or different pieces of notification data 132 may be generated and transmitted to the plurality of HMDs 100B and 100C. The transmission destination may be specified in accordance with an input from the administrator UA whenever the transmission is performed or may be determined in accordance with the transmission destination setting data 122.

In step S23, the control section 140 of the HMD 100B evaluates whether or not an end condition has been satisfied (step S23). The end condition is satisfied, for example, when all actions contained in the action guidance data 133 received in step S12 have been completed or when the input recognition section 162 has detected an end instruction input. When the end condition has not been satisfied (step S23: NO), the control section 140 returns to step S15. When the end condition has been satisfied (step S23: YES), the control section 140 terminates the present procedure. At the time of termination of the procedure, the control section 140 may duplicate the action guidance data 133 stored in the reception data storage section 127, store the duplicated action guidance data 133 in the transmission data storage section 126, and transmit the duplicated action guidance data 133 to the HMD 100A. Further, the control section 140 may transmit notification data 132 that notifies the HMD 100A of the action termination.

In step S40, the control section 140 of the HMD 100A evaluates whether or not an end condition has been satisfied (step S40). The end condition is satisfied, for example, when the HMD 100B has notified the HMD 100A of action termination or when the input recognition section 162 has detected an end instruction input. When the end condition has not been satisfied (step S40: NO), the control section 140 returns to step S34. When the end condition has been satisfied (step S40: YES), the control section 140 terminates the present procedure. At the time of termination of the procedure, the control section 140 may transmit notification data 132 that notifies the termination to the other HMDs 100 contained in the display system 1. In this case, an HMD 100 other than the HMD 100A used by the administrator UA may be set to terminate any action when the HMD 100 receives the notification data 132 that notifies the termination from the HMD 100A.

In the flowchart shown in FIG. 9A, the HMD 100B carries out the process of detecting an input (step S17), the process of detecting a change in the action state (step S19), the process of receiving the notification data 132 (step S21), and the process of evaluating the termination (step S23) sequentially on a step basis, but the invention is not necessarily configured this way. The action of each of the steps described above may be performed as an interruption process. That is, the control section 140 of the HMD 100B starts operating in step S11 and is then ready for the input detection (step S17), the detection of a change in the action state (step S19), the reception of the notification data 132 (step S21), and the instruction of the termination (step S23). When an input or an action is detected, the action of the corresponding one of the steps S17, S19, S21, and S23 may be initiated as an interruption process. The same holds true for the steps S34, S38, S39, and S40 in FIG. 9B.

Figures 10A, 10B:
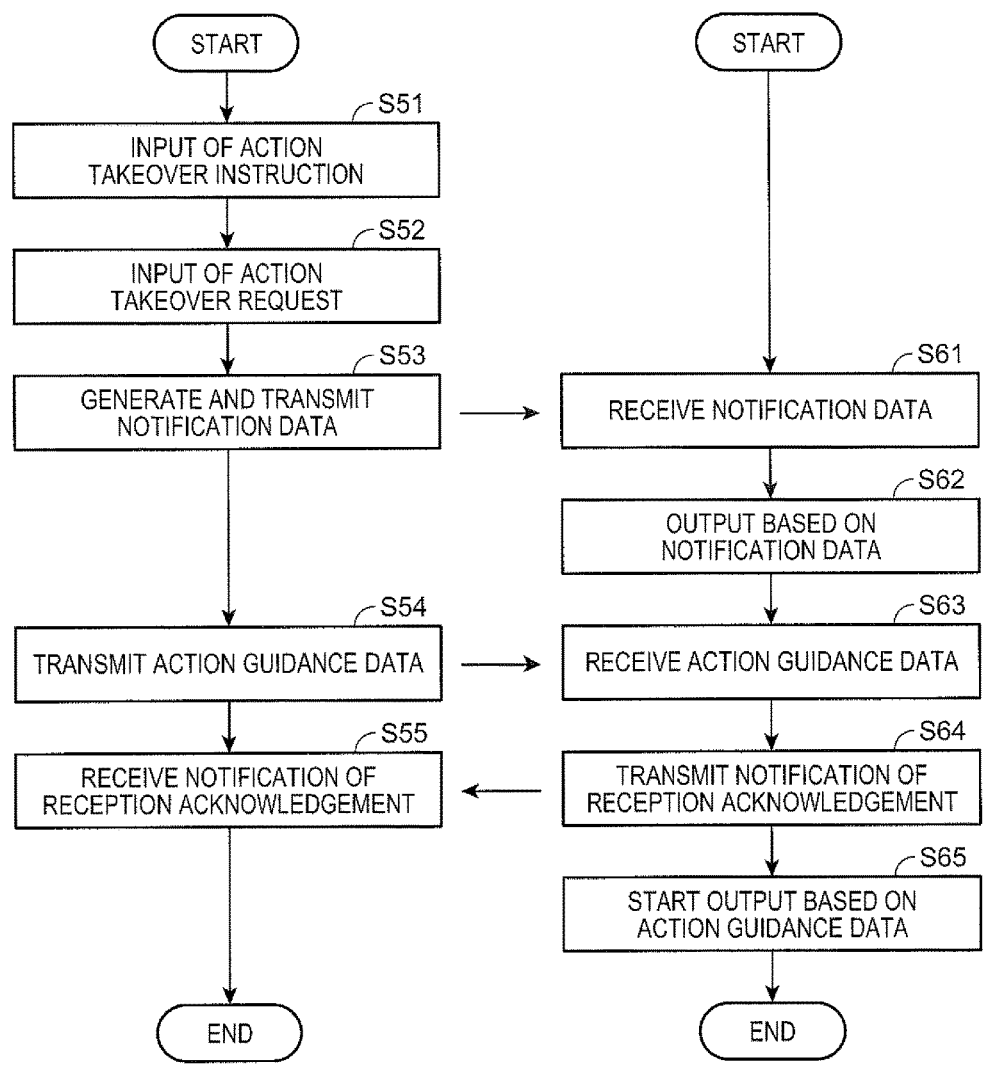
FIGS. 10A and 10B are flowcharts showing the action of the display system.

FIGS. 10A and 10B are flowcharts showing the action of the display system 1 and show an action in which data on actions are taken over between the HMDs 100B and 100C used by the workers UB and UC who perform the actions. FIG. 10A shows the action of the HMD 100B, and FIG. 10B shows the action of the HMD 100C. FIGS. 10A and 10B show a case where an action is taken over from the HMD 100B to the HMD 100C.

The action in FIGS. 10A and 10B is performed during a period for which the HMD 100B performs an action in accordance with the action guidance data 133, that is, during a period between steps S13 to S23 in FIG. 9A.

The input recognition section 162 of the HMD 100B detects an input of an action takeover instruction (step S51) and then detects an input of an action takeover request to an HMD 100 that takes over the action (step S52). The input recognition section 162 generates notification data 132 on the basis of the content of the input relating to the action takeover request, stores the notification data 132 in the transmission data storage section 126, and transmits the notification data 132 to the HMD 100C (step S53).

The AR display control section 163 of the HMD 100C receives the notification data 132 from the HMD 100B, stores the notification data 132 in the reception data storage section 127 (step S61), and outputs a text, a still image, motion images, voice, or any other type of information on the basis of the received notification data 132 (step S62).

The control section 140 of the HMD 100B duplicates the action guidance data 133 stored in the reception data storage section 127, stores the duplicated action guidance data 133 in the transmission data storage section 126, and transmits the duplicated action guidance data 133 to the HMD 100C (step S54). The action guidance data 133 is data having been stored in the reception data storage section 127 and updated in accordance with the progress of the action in the HMD 100B.

The control section 140 of the HMD 100C receives the action guidance data 133 and stores it in the reception data storage section 127 (step S63). The AR display control section 163 produces a notification of the reception of the action guidance data 133, transmits the notification to the HMD 100B (step S64), and starts, for example, displaying a still image, motion images, a text, or any other type of information and/or outputting voice on the basis of the received action guidance data 133 (step S65). At this point, the AR display control section 163 outputs, in accordance with the state information 133c contained in the received action guidance data 133, the guidance information 133a formed of an action under execution or an action not having been performed. The worker UC, who wears the HMD 100C, can therefore follow the action having been performed by the worker UB, who wears the HMD 100B, and perform an action on the target OB (FIG. 2) in accordance with the guidance based on the action guidance data 133.

The control section 140 of the HMD 100B receives the notification relating to the reception of the action guidance data 133 from the HMD 100C (step S55) and terminates the present procedure. At this point, the control section 140 of the HMD 100B may delete the action guidance data 133 stored in the reception data storage section 127. The control section 140 of the HMD 100B may also delete the action guidance data 133 stored in the transmission data storage section 126. Since the action guidance data 133 is therefore not redundantly held by a plurality of HMDs 100, a situation in which actions are mixed up can be avoided.

The input of the action takeover instruction and the action takeover request in steps S11 and S12 may be performed in the HMD 100A. In this case, notification data 132 on the action takeover instruction is transmitted from the HMD 100A to the HMDs 100B and 100C, and the HMDs 100B and 100C may start the action in FIGS. 10A and 10B in accordance with the notification data 132.

Figure 11A:
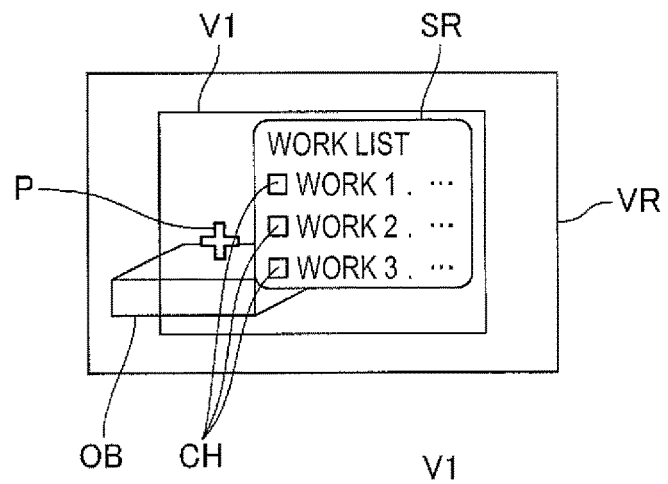
FIGS. 11A to 11C show examples of display in the display system.
Figure 11B:
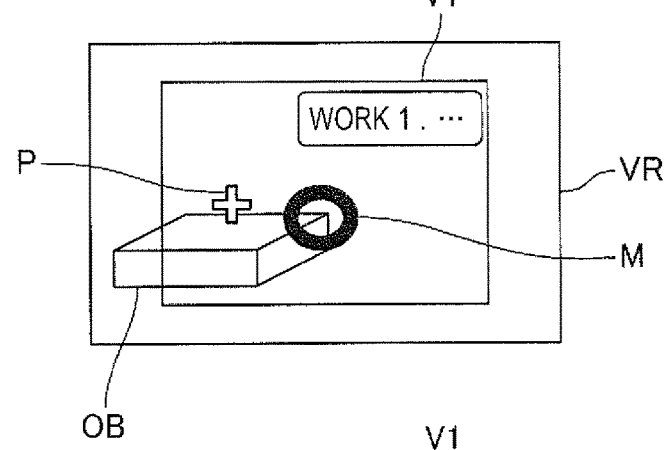
Figure 11C:
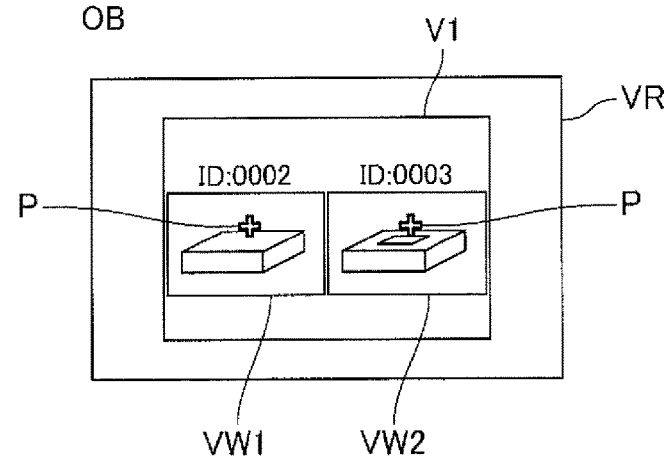

FIGS. 11A to 11C show examples of display in the display system. FIG. 11A shows an example in which the HMDs 100B and 100C perform display for the workers UB and UC, and FIG. 11B shows another example in which the HMDs 100B and 100C perform display for the workers UB and UC. FIG. 11C shows an example in which the HMD 100A performs display.

In FIGS. 10A to 10C, reference character VR denotes the field of view of a user (administrator UA, workers UB and UC), and reference character V1 denotes a region in which an HMD 100 displays an image and allows the user to view the image, that is, the display region of the image display section 20. The display region V1 is, for example, located roughly at the center of the user's field of view VR and narrower than the field of view VR. The size of the display region V1 may instead be equal to the size of the field of view VR, and the size and the position of the display region V1 are not limited to those in the examples shown in FIGS. 11A to 11C.

In FIG. 11A, the AR display control section 163 displays a list SR, which lists the contents of the guidance information 133a in the action guidance data 133. The list SR is a list in which the contents of the guidance information 133a contained in the action guidance data 133 are arranged in accordance with the order specified by the order information 133b. The list SR may display the titles and contents of the of guidance information 133a. Instead, the order specified by the order information 133b may be displayed.

In the list SR, check boxes CH are disposed in correspondence with the positions where the contents of guidance information 133a are displayed. Each of the check boxes CH, when it is checked, indicates that the corresponding action in the action guidance data 133 has been completed. When the state detection section 164 detects that an action has been completed, the AR display control section 163 changes the display state of the corresponding check box CH to a state showing action complete. In response to the change, the state detection section 164 may update the state information 133c in the action guidance data 133 in the reception data storage section 127. When the number of contents of guidance information 133a contained in the action guidance data 133 is one, the list SR contains the content of the one action and the check box CH associated therewith.

The list SR can instead have a configuration with no check box CH. In this case, the AR display control section 163 may delete, from the list SR, an item corresponding to an action detected by the state detection section 164 that the action has been completed. Instead, the color or brightness displayed in the list SR may be changed.

The example shown in FIG. 11B is a case where the contents of the guidance information 133a in the action guidance data 133 is displayed one by one or on a preset number basis. In this example, the contents of the guidance information 133a are displayed one by one in the display region V1 and in a balloon-shaped display section D. The edge of the display section D may be drawn in the form of an arrow that points an action target position of the target OB. Instead, a marker M may be displayed in a position on which an action corresponding to the guidance information 133a displayed in the display section D is performed. In the example shown in FIG. 11B, when the state detection section 164 detects that an action corresponding to the guidance information 133a displayed in the display section D is completed, the AR display control section 163 displays the following guidance information 133a contained in the action guidance data 133 in the display section D. The itemized actions in the guidance information 133a are thus sequentially displayed in the display section D in accordance with the order in accordance with which the actions are performed.

The display position and display form of each of the list SR and the display section D can be changed as appropriate. For example, each of the list SR and the display section D may be displayed in a position where the list SR or the display section D overlaps with the target OB on which an action corresponding to an item in the action guidance data 133 is performed. However, displaying the list SR or the display section D in a position where the list SR or the display section D does not overlap with the target OB is advantageous in that the list SR or the display section D does not prevent the action and allows the action to be readily performed while the item is viewed. Instead, the list SR or the display section D may be displayed in a 3D (stereoscopic) form or as a 2D (planar) image. Still instead, the list SR or the display section D may be displayed only by one of the right display driver 22 and the left display driver 24.

In FIGS. 11A and 11B, a pointer P, which indicates the direction of the user's sight lines detected with the sight line sensors 68, may be displayed in the display region V1.

The example shown in FIG. 11C is an example in which the HMD 100A displays still images based on the visual field data 131 transmitted from the HMDs 100B and 100C. In the display region V1, a visual field display VW1 based on the visual field data 131 from the HMD 100B and a visual field display VW2 based on the visual field data 131 from the HMD 100C are displayed side by side. In the visual field displays VW1 and VW2, IDs representing the HMDs 100B and 100C, which are transmission sources, are displayed in correspondence therewith. In this case, the administrator UA can view the visual fields of the workers UB and UC at the same time.

Further, in the visual field displays VW1 and VW2 are displayed the pointer P indicating the direction of the sight lines of the worker UB and the pointer P indicating the direction of the sight lines of the worker UC, respectively. The pointer P can be displayed when the visual field data 131 contains data representing the position where the pointer P is displayed.

As described above, in the display system 1, among the plurality of HMDs 100, the HMD 100A, which has been set in advance as the HMD 100 for an administrator, can display the visual fields of the other HMDs 100B and 100C in the form of images. Further, the content of an input or a content corresponding to the input in each of the HMDs 100B and 100C is transmitted to the HMD 100A in the form of the notification data 132, and the HMD 100A can output the notification data 132. Therefore, in the display system 1, the action guidance data 133 allows assistance of actions performed by a plurality of performers who perform the actions and grasp of situations in which the actions are performed.

The input to the HMD 100 can be performed in the form of voice, as described above, and a gesture can be detected for GUI operation of the HMD 100. Further, input through a foot switch and knock operation performed on the image display section 20 are also allowed. Input contents corresponding to the input to a foot switch and the input by the knock operation may be set in advance in the input recognition section 162. For example, when the foot switch is turned on, a message set in advance by the setting data 121 may be transmitted as the notification data 132. Further, for example, knock operation performed on the image display section 20 may trigger transmission of image data captured with the right camera 61 and the left camera 62 to the HMD 100A as the notification data 132 along with a message or after preset image processing is performed on the image data. In this case, the foot switch, the knock operation, or any other input operation allows emergency contact with the administrator UA, a request for assistance, or any other action. Further, the transmission destination in the case where input through the foot switch, input of the knock operation, or any other type of input is detected may be set by the transmission destination setting data 122. In this case, for example, in the event of an emergency, an emergency message can be transmitted from one HMD 100 to the other HMDs 100 for display of the emergency message.

The assistance and administration of the workers (performers) using the plurality of HMDs 100 can be administered by the HMD 100A in the administrator's site A provided in a separate room or at a remote location, whereby the point at which a performer's gaze is directed and the content of an action of the performer can be checked. The work in the work line FA can be quickly checked, for example, by measurement of lost time for each performer who wears an HMD 100 and discovery of occurrence of a defect due to work failure. In this case, lost time in the work line FA can be shortened, and the overall throughput can be improved.

Further, causing the plurality of HMDs 100 to provide output based on the action guidance data 133 allows work assistance images to be displayed as teaching images for unification of work order and synchronization of workers with one another. When a performer needs to be replaced, work can be taken over between HMDs 100, as described with reference to FIGS. 10A and 10B, whereby the same work order can be taken over.

Further, making use of the display system 1 allows evaluation of whether or not the worker who uses any of the HMDs 100 among the HMDs 100 connected to one another via the communication network 4 is idle. The administrator UA can therefore issue information that allows efficient supply of a necessary member to an idle worker's site.

Further, the function of transmitting the notification data 132 from the HMD 100A to each of the HMDs 100B and 100C and causing the HMD 100 to output the notification can be used to cause the image display section 20 to display an indicator as a sign that prompts supply of a necessary member. Exchange of information among the wearers of the HMDs 100 as described above allows smooth supply of parts, work takeover, and other types of operation, whereby a series of work can be continuously maintained.

FIGS. 12A to 12D are descriptive diagrams showing a specific application example of the invention. In the specific application example, a plurality of workers UB, UC, and UD wear HMDs 100, an administrator UA wears an HMD 100, and the workers UB, UC, and UD work under the administration of the administrator UA, as in the work line shown in FIG. 2. The HMD 100 worn by the administrator UA is called an HMD 100A, and the HMDs 100 worn by the workers UB, UC, and UD are called HMDs 100B, 100C, and 100D, respectively. Each of the HMDs 100A, 100B, 100C, and 100D has the configuration of the HMD 100 described above.

Figure 12A:
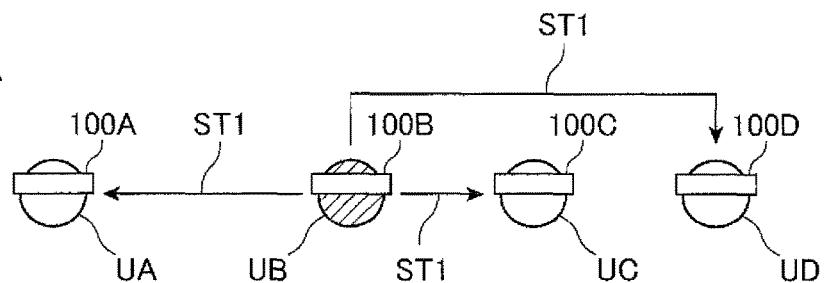
FIGS. 12A to 12D are descriptive diagrams showing a specific application example of the invention.

When a trouble has occurred in the work performed by the worker UB, and the evaluation section 166 of the HMD 100B has determined that the state of the worker UB is the state in which notification data 132 should be transmitted, the notification data 132 is transmitted from the HMD 100B to the HMD 100A (step ST1), as shown in FIG. 12A. The destination to which the notification data 132 is transmitted is set by the transmission destination setting data 122 described above and is, for example, a group including the HMDs 100A, 100C, and 100D. The notification data 132 can notify the administrator UA and the workers UC and UD of the occurrence of a problem with the worker UB.

Figure 12B:
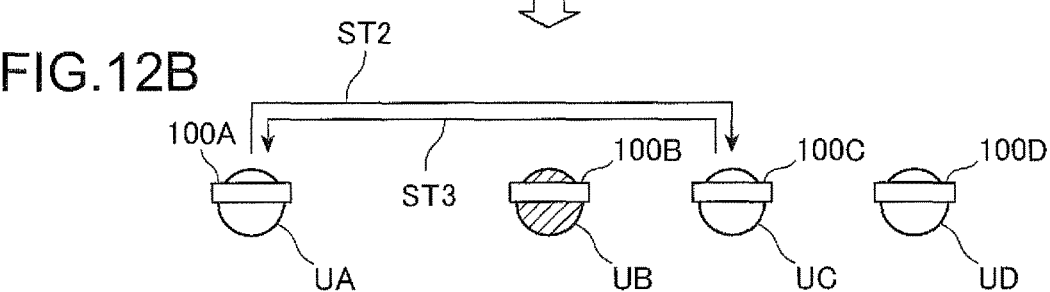

Subsequently, the administrator UA operates the HMD 100A to cause it to transmit notification data 132 containing an instruction to the HMD 100C (step ST2), as shown in FIG. 12B. Instead, the worker UC operates the HMD 100C to cause it to transmit notification data 132 on assistance offer to the HMD 100A (step ST3). The mutual transmission and reception of the notification data 132 allow determination of replacement of the worker UB with the worker UC.

Figure 12C:
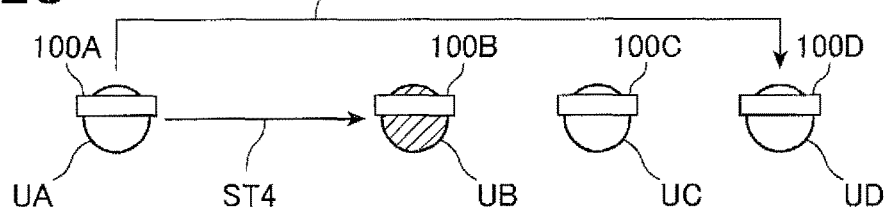

Thereafter, the administrator UA operates the HMD 100A to cause it to transmit notification data 132 representing that the worker UC replaces the worker UB to the HMDs 100B and 100D (step ST4), as shown in FIG. 12C.

The worker UB then leaves the work line, and the worker UC moves to the work site in place of the worker UB. At this point, the worker UC provides an input to the HMD 100C to cause it to transmit notification data 132 representing completion of the replacement to the HMDs 100A and 100D.

Figure 12D:
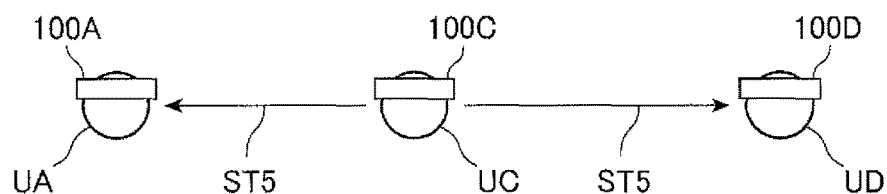

When the worker UB leaves, action guidance data may be transmitted from the HMD 100B to the HMD 100C in a period between the state in FIG. 12C and the state in FIG. 12D.

As described above, application of the invention allows quick discovery of time lost by a single user in in-line work and occurrence of a defect due to work failure, whereby lost time in the entire in-line work can be shortened, and the overall throughput can be improved. Each worker can readily and quickly share and check the work of the worker and action of conduct of the worker with another HMD wearer for improvement in reliability of team work and conduct. Further, the users who wear the HMDs 100 can share information, and an HMD 100 can share information with the other HMDs 100 in parallel to one another, in a loop form, or in series. An administrator is not necessarily stationed in a vicinity of a work line and may be stationed in any position where the administrator can administer the work line, and the administrator s HMD 100 can further monopolistically collect and administer information. For example, setting the transmission destination setting data 122 and the reference or condition of evaluation made by the evaluation section 166 allow proper use of the range over which the information is shared and the procedure in accordance with which information is shared depending on TPO (use application).

As described above, the display system 1 according to the embodiment to which the invention is applied includes a plurality of HMDs 100, which are head-mounted-type display apparatus. Each of the HMDs 100 includes the image display section 20, which allows a user to view an image and transmits an outside scene, and the communication section 117, which communicates with the other HMDs 100. Each of the HMDs 100 further includes the right camera 61 and the left camera 62, which perform image capturing over a range that overlaps with the user's visual field, the evaluation section 166, which evaluates the user's state, and the control section 140. The control section 140 transmits the visual field data 131 on the basis of the captured images to another HMD 100 and transmits the notification data 132 in accordance with a result of the evaluation performed by the evaluation section 166 to another HMD 100 via the communication section 117. The control section 140 further causes the image display section 20 to perform display on the basis of data transmitted from another HMD 100. In the display system 1, data on the visual fields and data on inputs can therefore be shared among the plurality of HMDs 100. As a result, a plurality of users who wear the HMDs 100 can share the visual fields and operation. For example, a person who performs an action and a person who assists the action wear the HMDs 100, which are head-mounted-type display apparatus, for conveyance of a large amount of information on actions in a more understandable manner. A user can therefore assist another user who performs work or any other type of act or readily and accurately administer the state in which work or any other type of act is performed.

Since the input recognition section 162 recognizes an input on the basis of voice detected by the voice processing section 187, the HMD 100 can accept an input in the form of voice, whereby information can be more readily conveyed among a plurality of HMDs 100.

The control section 140 transmits data representing an input recognized by the input recognition section 162 on the basis of voice detected by the voice processing section 187 to another HMD 100. A content inputted in the form of voice to an HMD 100 can therefore be notified to a user who wears another HMD 100.

The HMD 100 includes the input recognition section 162, which recognizes an input, and the evaluation section 166 evaluates the state of the user on the basis of an input recognized by the input recognition section 162. The HMD 100 can therefore recognize an input from the user or another person to appropriately evaluate the state of the user. Further, the user or another person allows the HMD 100 to recognize an input to intentionally cause the HMD 100 to transmit notification data to another apparatus.

The HMD 100 further includes the nine-axis sensor 66, which detects motion of the image display section 20, and the input recognition section 162 may instead recognize an input on the basis of motion detected with the nine-axis sensor 66. In this case, the input recognition section 162 can accept an input according to motion of the image display section 20 or motion of the user who wears the image display section 20.

The input recognition section 162 may instead recognize an input on the basis of images captured with the right camera 61 and the left camera 62. In this case, the input recognition section 162 can more readily accept an input.

The control section 140 carries out a reproduction process of reproducing the action guidance data 133 including the guidance information 133a, which gives guidance on actions, the order information 133b, which specifies the order in accordance with which the actions are performed, and the state information 133c, which shows the state of the performed actions. In the reproduction process, the control section 140 causes the image display section 20 to display a text, a still image, motion images, or any other type of information. The control section 140 updates, on the basis of an input recognized by the input recognition section 162, the state information 133c in the action guidance data 133 being reproduced and causes the communication section 117 to transmit the action guidance data 133 having undergone the reproduction process to another HMD 100. As a result, action guidance can be given to a user who wears an HMD 100 and performs an action, and data containing records on the action performed in accordance with the guidance can be taken over and used by the other HMD 100.

The invention is not limited to the configuration of the embodiment described above and can be implemented in a variety of aspects to the extent that they do not depart from the substance of the invention.

In the embodiment described above, the configuration in which a user views an outside scene that passes through the display section is not limited to the configuration in which the right optical image display section 26 and the left optical image display section 28 transmit outside light. For example, the invention is also applicable to a display apparatus that displays an image but does not allow a user to view an outside scene. Specifically, the invention is applicable to a display apparatus that displays images captured with the right camera 61 and/or the left camera 62, an image and a CG produced on the basis of the captured images, video images based on prestored video data or externally inputted video data, and other types of image. An example of a display apparatus of this type may include a display apparatus that does not allow a user to view an outside scene or what is called a closed-type display apparatus. Further, a display apparatus that does not perform AR display, MR display, or VR display but displays externally inputted video data or an analog video signal is, of course, an apparatus to which the invention is applied.

Further, for example, the image display section 20 may be replaced with an image display section worn, for example, as a cap or any other image display section worn based on another method. A display section that displays an image in correspondence with a user's left eye and a display section that displays an image in correspondence with the user's right eye only need to be provided. Moreover, the display apparatus according to the embodiment of the invention may, for example, be configured as a head mounted display incorporated in an automobile, an airplane, and other vehicles. Further, for example, the display apparatus may be configured as a head mounted display built in a helmet or other body protection gears. In this case, a portion that determines the position relative to a user's body and a portion that is positioned relative to the positioning portion can be a portion worn by the user.

Further, in the embodiment described above, the description has been made of the case where the image display section 20 is separated from the control device 10 and they are connected to each other via the connection section 40. The control device 10 and the image display section 20 can instead be integrated with each other, and the integrated unit can be worn around a user's head.

The control device 10 may be a notebook computer, a tablet computer, or a desktop computer. Instead, the control device 10 may, for example, be a mobile electronic apparatus including a game console, a mobile phone, a smartphone, and a mobile media player, or any other dedicated apparatus. Further, the control device 10 may be configured to be separate from the image display section 20, and a variety of signals may be transmitted and received between the control device 10 and the image display section 20 over wireless communication.

Further, for example, the configuration that generates image light in the image display section 20 may be a configuration including an organic EL (organic electroluminescence) display and an organic EL control section.

Moreover, an LCOS (liquid crystal on silicon) device (LCoS is a registered trademark), a digital micromirror device, or any other device can be used as the configuration that generated image light.

The "display section" used herein corresponds to a configuration that outputs image light, and output of image light from the HMD 100 is called "display" in the following description.

The embodiment described above illustrates the configuration in which the right and left image light generation units described with reference to FIGS. 5A and 5B generate image light and the right optical image display section 26 and the left optical image display section 28 shown in FIG. 3 radiate the image light toward the user's right and left eyes to cause the image light to be incident on the user's right and left eyes. The configuration of the "display section" is not limited to the configuration described above. That is, any configuration that radiates the image light other than the configuration shown in FIG. 3 and FIGS. 5A and 5B can be used. For example, in the configuration of the present embodiment, the "right light guide unit" and the "left light guide unit" having the half-silvered mirrors 261A and 262A output the image light toward the user's eyes. As the configuration that generates image light, the right backlight 221 and the left backlight 222 as well as the right LCD 241 and the left LCD 242 are provided. The "display section" does not require this configuration as an essential portion.

For example, image light generated by a mechanism in which one or both of the right display driver 22 and the left display driver 24 of the image display section 20 are built may be reflected off a reflection mechanism provided on the user's side of the image display section 20, that is, the side facing the user's eyes and outputted toward the user's eyes. The reflection mechanism can, for example, be a sweep system using a MEMS (micro electro mechanical systems) mirror. That is, a configuration in which a sweep system having a MEMS mirror that sweeps the light outputted from the image light generation units is provided and the light swept by the sweep system is directly incident on the user's eyes may be employed. Further, the image display section 20 may be provided with an optical member on which a virtual image is formed by the light swept by the sweep system. The optical member uses the light swept with the MEMS mirror to form a virtual image. In this case, when the MEMS mirror sweeps light, a virtual image is formed on a virtual image formation plane, and the user captures the virtual image with the eyes to view (recognize) the image. The optical part in this case may be a part that guides light by reflecting the light multiple times, for example, the right light guide plate 261 and the left light guide plate 262 in the embodiment described above, or may be a half-silvered surface.

The sweep system is not limited to the configuration including a MEMS mirror. The mechanism that generates image light may also instead be a laser light source that emits laser light. For example, the invention is also applicable to a laser-retina-projection-type head mounted display. That is, a configuration in which a light output section may include a laser light source and an optical system that guides the laser beam from the laser light source to user's eyes may be employed. In this configuration, the laser beam is caused to be incident on each of the user's eyes, and the laser beam is swept over the retina to form an image on the retina, so that the user is allowed to view the image.

Instead, in place of the virtual formation plane that receives the swept light, a diffraction grating may be used to guide the image light to the user's eyes. That is, the configuration in which the image light is guided through an optical member is not necessarily employed, and a configuration having only a function of guiding the image light toward the user's eyes by refracting and/or reflecting the image light.

In the configuration in which a sweep system having a MEMS or any other component, changing the angle at which the sweep system is attached to the image display section 20 allows the position where the user views an image, that is, the position where an image is displayed to be changed. Therefore, in the process of changing the image display position in the embodiment described above, the angle of the sweep system may be changed instead of changing the position where images are displayed in the right LCD 241 and the left LCD 242.

As the optical system that guides image light to the user's eyes, an employable configuration includes an optical member that transmits external light externally incident on the display apparatus and allows the external light along with image light to be incident on the user's eyes. Another usable optical system may be an optical member that is disposed in a position in front of the user's eyes and overlaps with part of the visual field of the user or coincides with the entire visual field of the user.

In the embodiment described above, the configuration in which the half-silvered mirrors 261A and 262A form virtual images on part of the right optical image display section 26 and the left optical image display section 28, which are located in front of the user's eyes is illustrated. The invention is not limited to the configuration described above, and a configuration in which an image is displayed in a display region that occupies the entire or majority of the right optical image display section 26 and the left optical image display section 28 may be employed. In this case, the process of reducing the size of an image may be included in the action of changing the position where the image is displayed.

Further, the optical element in the invention are not limited to the right light guide plate 261 and the left light guide plate 262 having the half-silvered mirrors 261A and 262A and only needs to be an optical part that causes image light to be incident on the user's eyes. Specifically, a diffraction grating, a prism, or a holography display section may be used.

At least part of the functional blocks shown in FIG. 6 may be achieved by hardware or hardware and software cooperating with each other, and the configuration formed of independent hardware resources shown in FIG. 6 is not necessarily employed. The program executed by the control section 140 may be stored in the storage section 120 or a storage device in the control device 10, or a program stored in an external device may be acquired via the communication section 117 or the interface 125 and executed. Among the configurations formed in the control device 10, only the operation section 135 may be formed as an independent user interface (UI). Further, the configurations formed in the control device 10 may be redundantly formed in the image display section 20. For example, the control section 140 shown in FIG. 6 may be formed both in the control device 10 and the image display section 20, and the control section 140 formed in the control device 10 and the CPU formed in the image display section 20 may perform different functions.

The entire disclosure of Japanese Patent Application No. 2015-135194, filed Jul. 6, 2015 is expressly incorporated by reference herein.

What is claimed is:

1. A system comprising:
a plurality of head-mounted-type display apparatuses, each display apparatus including:
   a display configured to display an image and transmit an outside scene to a user,
   a transmitter/receiver that communicates with another display apparatus in the plurality of display apparatus,
   at least one camera performing image capturing over a range that overlaps with a visual field of the user,
   a recognition sensor that recognizes an input;
   an evaluation sensor that evaluates a state of the user based on the input recognized by the recognition sensor, the evaluation sensor measuring: (A) a position of the user's body via a nine-axis sensor, or (B) an electrical activity of skeletal muscles, a pulse, a blood pressure, or a blood oxygen level of the user's body via a vital sensor, and
   a processor programmed to:
      transmit visual field data on the basis of an image captured by the at least one camera to the another display apparatus,
      receive a result of the evaluation performed by the evaluation sensor including at least one of the position of the user's body, the electrical activity of skeletal muscles, the pulse, the blood pressure, or the blood oxygen level of the user's body,
      perform a reproduction process of reproducing action guidance data containing: (i) guidance information that gives guidance on actions, (ii) order information that specifies an order in accordance with which the actions are performed, and (iii) state information that shows a state of the performed actions,
      cause the display to perform display in the reproduction process and update, on the basis of the input recognized by the recognition sensor, the state information in the action guidance data being reproduced,
      cause the transmitter/receiver to transmit to the another display apparatus: notification data on the basis of the result of the evaluation performed by the evaluation sensor, and the action guidance data having undergone the reproduction process, and
      cause the display to display information on the basis of data transmitted from the another display apparatus.

2. The display system according to claim 1, wherein the evaluation sensor evaluates, on the basis of an action of the user, whether the state of the user corresponds to a state in which notification set in advance should be made, and
when the evaluation sensor determines that the state of the user corresponds to the state in which notification should be made, the processor causes the transmitter/receiver to transmit notification data to the another display apparatus.

3. The display system according to claim 1, wherein each of the display apparatus includes:
an audio sensor that detects voice, wherein
the recognition sensor recognizes the input on the basis of the voice detected by the audio sensor.

4. The display system according to claim 3, wherein the processor transmits data representing the input recognized by the recognition sensor on the basis of the voice detected by the audio sensor to the another display apparatus.

5. The display system according to claim 1, wherein each of the display apparatus includes:
a motion detection sensor that detects motion of the display, wherein
the recognition sensor recognizes the input on the basis of the motion detected by the motion detection sensor.

6. The display system according to claim 1, wherein the recognition sensor recognizes the input on the basis of an image captured by the least one camera.

7. The display system according to claim 1, wherein the least one camera performs image capturing over a range that overlaps with a direction in which the user gazes.

8. A head-mounted-type display apparatus comprising:
a display configured to display an image and transmit an outside scene to a user;
a transmitter/receiver that communicates with another head-mounted-type display apparatus;
an least one camera that performs image capturing over a range that overlaps with a visual field of the user;
a recognition sensor that recognizes an input;
an evaluation sensor that evaluates a state of the user based on the input recognized by the recognition sensor, the evaluation sensor measuring: (A) a position of the user's body via a nine-axis sensor, or (B) an electrical activity of skeletal muscles, a pulse, a blood pressure, or a blood oxygen level of the user's body via a vital sensor; and
a processor programmed to:
transmit visual field data on the basis of an image captured by the least one camera to the another display apparatus,
receive a result of the evaluation performed by the evaluation sensor including at least one of the position of the user's body, the electrical activity of skeletal muscles, the pulse, the blood pressure, or the blood oxygen level of the user's body,
perform a reproduction process of reproducing action guidance data containing: (i) guidance information that gives guidance on actions, (ii) order information that specifies an order in accordance with which the actions are performed, and (iii) state information that shows a state of the performed actions,
cause the display to perform display in the reproduction process and update, on the basis of the input recognized by the recognition sensor, the state information in the action guidance data being reproduced,
cause the transmitter/receiver to transmit to the another display apparatus: notification data on the basis of the result of the evaluation performed by the evaluation sensor, and the action guidance data having undergone the reproduction process, and
cause the display to perform display on the basis of data transmitted from the another display apparatus.

9. A method for controlling a head-mounted-type display apparatus including a display that allows a user to view an image and transmits an outside scene, the method comprising:
performing image capturing over a range that overlaps with a visual field of the user;
evaluating a state of the user based on an input received by a recognition sensor, including measuring: (A) a position of the user's body via a nine-axis sensor, or (B) an electrical activity of skeletal muscles, a pulse, a blood pressure, or a blood oxygen level of the user's body via a vital sensor;
transmitting visual field data on the basis of captured image data to another head-mounted-type display apparatus;
receiving a result of the evaluation including at least one of the position of the user's body, the electrical activity of skeletal muscles, the pulse, the blood pressure, or the blood oxygen level of the user's body;
performing a reproduction process of reproducing action guidance data containing: (i) guidance information that gives guidance on actions, (ii) order information that specifies an order in accordance with which the actions are performed, and (iii) state information that shows a state of the performed actions;
causing the display to perform display in the reproduction process and update, on the basis of the input recognized by the recognition sensor, the state information in the action guidance data being reproduced;
transmitting to the another display apparatus: notification data on the basis of the result of the evaluation of the state of the user, and the action guidance data having undergone the reproduction process; and
causing the display to display information on the basis of data transmitted from the another display apparatus.

10. A non-transitory computer readable memory storing a program that is executable by a computer controlling a head-mounted-type display apparatus having a display allowing a user to view an image and to transmit an outside scene, the program causing the computer to perform steps comprising:
performing image capturing over a range that overlaps with a visual field of the user;
evaluating a state of the user based on an input received by a recognition sensor, including measuring: (A) a position of the user's body via a nine-axis sensor, or (B) an electrical activity of skeletal muscles, a pulse, a blood pressure, or a blood oxygen level of the user's body via a vital sensor;
receiving a result of the evaluation including at least one of the position of the user's body, the electrical activity of skeletal muscles, the pulse, the blood pressure, or the blood oxygen level of the user's body;
performing a reproduction process of reproducing action guidance data containing: (i) guidance information that gives guidance on actions, (ii) order information that specifies an order in accordance with which the actions are performed, and (iii) state information that shows a state of the performed actions;
causing the display to perform display in the reproduction process and update, on the basis of the input recognized by the recognition sensor, the state information in the action guidance data being reproduced;
transmitting visual field data on the basis of captured image data to another head-mounted-type display apparatus;
transmitting to the another display apparatus: notification data on the basis of the result of the evaluation of the state of the user, and the action guidance data having undergone the reproduction process; and
causing the display to display information on the basis of data transmitted from the another display apparatus.

* * * * *